US012781437B2

(12) United States Patent
Caruso et al.

(10) Patent No.: US 12,781,437 B2
(45) Date of Patent: Nov. 3, 2026

(54) NANOCOMPOSITE BARRIER PAPER LAMINATE

(71) Applicant: The Procter & Gamble Company, Cincinnati, OH (US)

(72) Inventors: Pier-Lorenzo Caruso, Frankfurt am Main (DE); Emily Charlotte Boswell, Cincinnati, OH (US); Maximilian Roehrl, Regensburg (DE); Josef Breu, Bayreuth (DE)

(73) Assignee: The Procter & Gamble Company, Cincinnati, OH (US)

( * ) Notice: Subject to any disclaimer, the term of this patent is extended or adjusted under 35 U.S.C. 154(b) by 328 days.

(21) Appl. No.: 18/102,093

(22) Filed: Jan. 27, 2023

(65) Prior Publication Data

US 2023/0235510 A1 Jul. 27, 2023

Related U.S. Application Data

(60) Provisional application No. 63/303,612, filed on Jan. 27, 2022.

(51) Int. Cl.

| | |
|---|---|
| ***D21H 19/82*** | (2006.01) |
| ***B32B 7/12*** | (2006.01) |
| ***B32B 27/10*** | (2006.01) |
| ***B32B 29/00*** | (2006.01) |
| ***B32B 38/16*** | (2006.01) |
| ***B65D 65/46*** | (2006.01) |

(52) U.S. Cl.

CPC ............... *D21H 19/82* (2013.01); *B32B 7/12* (2013.01); *B32B 27/10* (2013.01); *B32B 29/002* (2013.01); *B65D 65/466* (2013.01); *B32B 38/16* (2013.01); *B32B 2250/02* (2013.01); *B32B 2264/12* (2013.01); *B32B 2264/201* (2020.08); *B32B 2264/30* (2020.08); *B32B 2305/30* (2013.01); *B32B 2307/7163* (2013.01); *B32B 2307/718* (2013.01); *B32B 2307/7242* (2013.01); *B32B 2307/726* (2013.01); *B32B 2307/732* (2013.01)

(58) Field of Classification Search

None

See application file for complete search history.

(56) References Cited

U.S. PATENT DOCUMENTS

| | | | |
|---|---|---|---|
| 10,100,215 | B2 | 10/2018 | Zischka et al. |
| 2002/0127358 | A1 | 9/2002 | Berlin et al. |
| 2006/0286294 | A1 | 12/2006 | Fish et al. |
| 2008/0108748 | A1 | 5/2008 | Buckley |

(Continued)

FOREIGN PATENT DOCUMENTS

| | | | |
|---|---|---|---|
| EP | 3578631 | A1 | 12/2019 |
| JP | 2019177586 | A | 10/2019 |

(Continued)

OTHER PUBLICATIONS

All Office Actions; U.S. Appl. No. 18/102,091, filed Jan. 27, 2023.

(Continued)

*Primary Examiner* — Tamra L. Dicus
(74) *Attorney, Agent, or Firm* — Kathleen Y. Carter; James E. Oehlenschlager

(57) ABSTRACT

A paper laminate comprising a water-dispersible nanocomposite barrier against any permeation.

35 Claims, 4 Drawing Sheets

(56) References Cited

U.S. PATENT DOCUMENTS

| | | | | |
|---|---|---|---|---|
| 2009/0274920 | A1* | 11/2009 | Li | B32B 7/12 264/210.1 |
| 2014/0099455 | A1* | 4/2014 | Stanley | B32B 27/36 428/34.3 |
| 2022/0033158 | A1* | 2/2022 | Boswell | B32B 27/10 |
| 2022/0033602 | A1 | 2/2022 | Caruso et al. | |
| 2022/0034040 | A1 | 2/2022 | Boswell et al. | |
| 2023/0087382 | A1* | 3/2023 | Vishtal | D21H 27/10 428/216 |

FOREIGN PATENT DOCUMENTS

| | | | |
|---|---|---|---|
| WO | 0154828 | A1 | 8/2001 |
| WO | 2009112255 | A1 | 9/2009 |
| WO | 2021165290 | A1 | 8/2021 |

OTHER PUBLICATIONS

Unpublished U.S. Appl. No. 18/102,09, filed Jan. 27, 2023, to Pier-Lorenzo Caruso et al.

Search Report and Written Opinion for PCT/US2023/061413 dated May 10, 2023, 12 pages.

* cited by examiner

NANOCOMPOSITE BARRIER PAPER LAMINATE

FIELD OF THE INVENTION

The present invention relates to a paper laminate comprising a water-dispersible nanocomposite barrier for flexible package applications or product delivery systems such as sachets, pouches, bags, comprising a paper combined with an adhesive layer, a water-dispersible nanocomposite barrier layer and a sealing layer offering several advantages compared to prior-art paper based flexible packages; and a method for producing paper laminates with an integrated water-dispersible nanocomposite barrier.

BACKGROUND OF THE INVENTION

Paper based packaging is becoming more popular amongst consumers because it is regarded as more natural, more recyclable, and more biodegradable. However, the barrier properties of uncoated paper are poor and attempts to improve the barrier properties by adding a coating often lead to reduction in the ability of the package to be recyclable in commercial paper recycling systems and also reduce its ability to biodegrade in various environments.

Uncoated paper-based packaging is very easily recyclable in commercial paper recycling systems and is typically biodegradable in certain environments. However, a paper with no coating or adhesive at all cannot easily be formed into a complete functional package. Also, uncoated paper-based packaging can only be used to contain dry products that do not require any type of moisture or gas or perfume or grease barrier. If the dry product is sensitive to moisture, it will be damaged by moisture entering the package very quickly. If it is sensitive to oxygen, it will oxidize. If the product is greasy then grease will migrate through the paper and leave unsightly stains on the outside of the package. If the product contains perfume, then perfume will escape out of the package and change the nature of the intended odor of the product. However, if a coating is added to the paper to improve the barrier properties and/or to make it sealable, one must be very careful to avoid negatively affecting the ability of the package to be recyclable in commercial paper recycling systems. In addition, in the event of improper disposal, it is desirable that the coating is not affecting the ability of the entire package to biodegrade across a range of the most expected environmental conditions. Failure to degrade may have adverse environmental effects such as persistent microplastics in seawater.

A common way to solve the poor barrier properties of paper and make it sealable is to add a polyethylene-based, or ethylene copolymer based or other non-biodegradable polymeric coating to the surface of the paper, either by coating, printing or lamination. However, if this polyethylene coating is too thick, it will negatively affect the recyclability of the paper laminate in typical commercial paper recycling systems. There are many examples where polyethylene coatings have caused issues in the paper recycling processes, especially where thicker coatings were used to increase seal strength and/or increase barrier properties. Examples of such issues are, but are not limited to: i) coatings that clog the filters in repulping tanks and systems; ii) coatings that hold tightly on the paper fibers and prevent a high % of the paper fibers being released into the water of the repulping system; iii) coatings that end up being incorporated into the recycled paper and negatively affect the appearance or performance properties of the resulting recycled paper.

If such polyethylene coating is made very thin, the overall structure might be considered recyclable in the paper recycling stream if it can be stripped off and sent to a landfill or burned to fuel the plant, leaving the paper fibers to be collected and recycled into paper. However, such structure still has several disadvantages because if it is improperly disposed in the environment, the paper would biodegrade, but not the polyethylene coating. This will instead form persistent microplastics negatively impacting the environment, appearing as a non-nutritive food source for some animals. Furthermore, many consumers may notice the appearance of the shiny polyethylene layer on the inner surface of the paper laminate and react negatively to it as non-natural material. A polyethylene coating would also adversely affect the ability of the package to be composted, either via industrial or home composting, unless the polyethylene coating could easily be removed by a consumer prior to composting.

If conversely biodegradable materials are used instead of polyethylene, such as those described in the patent application US2002/0127358, the barrier properties of that barrier paper laminate against moisture permeation will be negatively affected, as it is well known that biodegradable materials are permeable to moisture. The coating made from biodegradable materials would need to be thick, causing issues in the paper recycling process.

There is therefore an unmet need for paper laminates for flexible packaging applications, provided with moisture barrier and sealant layer, with increased recycling efficiency in industrial paper repulping systems, increased biodegradation kinetics and reduced environmental impact such as soil and aquatic environments.

SUMMARY OF THE INVENTION

A paper laminate comprising a water-dispersible nanocomposite barrier is provided, that is recyclable in industrial paper recycling facilities, that is compatible with home or industrial composting facilities, and that is biodegradable if improperly disposed in the environment. The paper laminate is made from a recyclable and/or biodegradable paper layer having an outer surface and an inner surface, an adhesive layer having an outer surface and an inner surface, said outer surface disposed on said inner surface of said paper layer, a water-dispersible nanocomposite barrier layer having an outer surface and an inner surface, said outer surface disposed on said inner surface of said adhesive layer, a sealing layer having an outer surface and an inner surface, said outer surface disposed on said inner surface of said water-dispersible nanocomposite barrier layer.

A method of making a paper laminate comprising a water-dispersible nanocomposite barrier is provided that comprises the application of an adhesive layer onto paper or board; the application of a water-borne nanocomposite dispersion onto the surface of the adhesive layer; the water removal from the nanocomposite dispersion to obtain a water-dispersible nanocomposite barrier layer; the application of a sealing layer onto the nanocomposite barrier layer.

A method of making a paper laminate comprising a water-dispersible nanocomposite barrier is provided that comprises the use of a sealable film; the application of a water-borne nanocomposite dispersion onto the surface of the sealable film; the water removal from the nanocomposite dispersion to obtain a water-dispersible nanocomposite barrier layer; the application of an adhesive layer onto the nanocomposite barrier layer; the lamination of paper or board onto the adhesive layer.

DETAILED DESCRIPTION OF THE INVENTION

Figure 1:
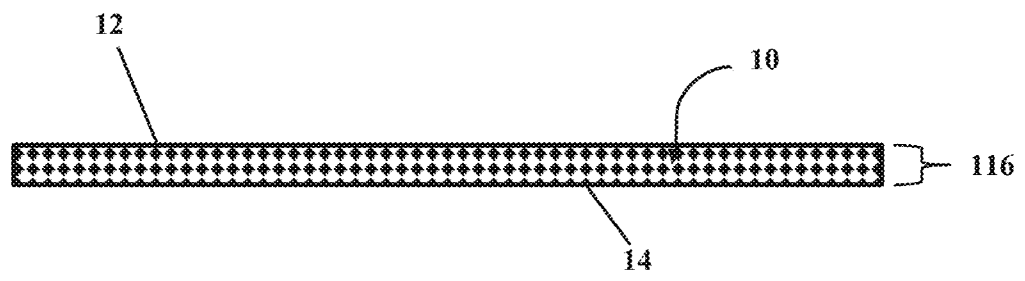
FIG. 1 shows a cross-section of a paper or board layer 10.

The invention describes a paper laminate comprising a water-dispersible nanocomposite barrier offering several advantages compared to prior art paper barrier laminates, and a method for making paper laminates comprising a water-dispersible nanocomposite barrier.

As used herein, the term "water-dispersible" means breaking apart in water in small fragments smaller than a tenth of millimeter. These fragments can, but do not need to be stably suspended in water.

As used herein, the term "nanocomposite" refers to heterogeneous materials comprising orderly spaced hydrophilic nanoplatelets and intercalated polymeric fillers at the nanometric scale; "nanometric scale" means below 100 nanometers.

As used herein, the term "water vapour transmission rate" or "WVTR" refers to the rate at which water vapour is transmitted through a paper, when measured according to the water vapour transmission test method set forth in the test methods section.

As used herein, the term "copolymer" means a polymer formed from two, or more, types of monomeric repeating units. The term "copolymer" as used herein further encompasses terpolymers, such as terpolymers having a distribution of vinyl alcohol monomer units, vinyl acetate monomer units, and possibly butene diol monomer units; however, if the copolymer is substantially fully hydrolyzed, substantially no vinyl acetate monomeric units may be present.

As used herein, the term "degree of hydrolysis" refers to the mole percentage of vinyl acetate units that are converted to vinyl alcohol units when a polymeric vinyl alcohol is hydrolyzed.

As used herein, when the term "about" modifies a particular value, the term refers to a range equal to the particular value, plus or minus twenty percent (+/−20%). For any of the embodiments disclosed herein, any disclosure of a particular value, can, in various alternate embodiments, also be understood as a disclosure of a range equal to about that particular value (i.e. +/−20%).

As used herein, when the term "approximately" modifies a particular value, the term refers to a range equal to the particular value, plus or minus fifteen percent (±15%). For any of the embodiments disclosed herein, any disclosure of a particular value, can, in various alternate embodiments, also be understood as a disclosure of a range equal to approximately that particular value (i.e. ±15%).

As used herein, when the term "substantially" modifies a particular value, the term refers to a range equal to the particular value, plus or minus ten percent (±10%). For any of the embodiments disclosed herein, any disclosure of a particular value, can, in various alternate embodiments, also be understood as a disclosure of a range equal to approximately that particular value (i.e. ±10%).

As used herein, when the term "nearly" modifies a particular value, the term refers to a range equal to the particular value, plus or minus five percent (±5%). For any of the embodiments disclosed herein, any disclosure of a particular value, can, in various alternate embodiments, also be understood as a disclosure of a range equal to approximately that particular value (i.e. ±5%).

FIG. 1 shows a cross-section of a paper or board layer 10. The paper or board layer 10 has a first surface 12 and a second surface 14 opposite to the first surface 12, a thickness 116 between the surfaces 12 and 14, and a grammage obtained from the density and the thickness 116.

The grammage of paper layer 10 can range from about 20 $g/m^2$ to about 200 $g/m^2$, preferably from about 40 $g/m^2$ to about 120 $g/m^2$, more preferably from about 50 $g/m^2$ to about 100 $g/m^2$ and more preferably from about 60 $g/m^2$ to 85 $g/m^2$. The grammage of board layer 10 can range from about 150 $g/m^2$ to about 500 $g/m^2$, preferably from about 190 $g/m^2$ to about 380 $g/m^2$, more preferably from about 230 $g/m^2$ to 260 $g/m^2$.

Figure 2:
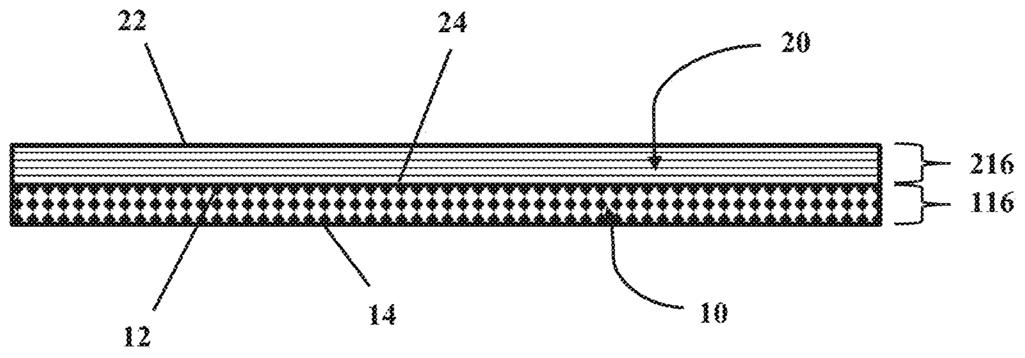
FIG. 2 shows a cross-section of an adhesive layer 20 coated onto a paper or board layer 10.

FIG. 2 shows a cross-section of an adhesive layer 20 having a first surface 22 and a second surface 24 opposite the first surface 22, and a thickness 216 between the first surface 22 and the second surface 24, applied to substantially cover at least one of the first surface 12 or the second surface 14 of the paper or board layer 10.

The thickness 216 of the adhesive layer 20 can range from about 1 μm to about 120 μm, preferably from about 1 μm to about 25 μm, more preferably from about 1 μm to about 10 μm, even more preferably between 1 μm to about 5 μm.

The adhesive layer 20 can comprise at least one water-soluble polymer. Depending on the application, the water-soluble polymer(s) can be selected among available options to dissolve in water at 23° C. temperature within seconds, or minutes, or hours. A polymer requiring more than 24 hours to dissolve in water at 23° C. temperature will not be considered as water-soluble.

Figure 3:
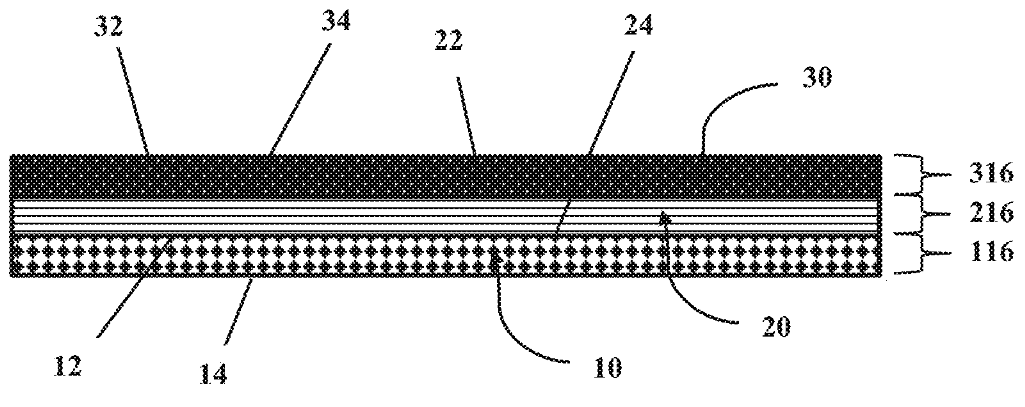
FIG. 3 shows a cross-section of a water-dispersible nanocomposite barrier layer 30 coated onto an adhesive layer 20 coated onto a paper or board layer 10.

FIG. 3 shows a cross-section of a water-dispersible nanocomposite barrier layer 30 having a first surface 32 and a second surface 34 opposite the first surface 32, and a thickness 316 between the first surface 32 and the second surface 34, applied to substantially cover at least one of the first surface 22 or the second surface 24 of the adhesive layer 20.

The thickness of the water-dispersible nanocomposite barrier layer 30 ranges from about 0.1 μm to about 20 μm, preferably from about 0.1 μm to about 10 μm, more preferably from about 0.1 μm to about 5 μm.

The water-dispersible nanocomposite barrier layer 30 is a nanocomposite comprising orderly spaced hydrophilic nanoplatelets and intercalated polymeric fillers at the nanometric scale, wherein the basal spacing measured via XRD is lower than 100 Å, preferably lower 60 Å, more preferably lower than 20 Å.

Figure 6:
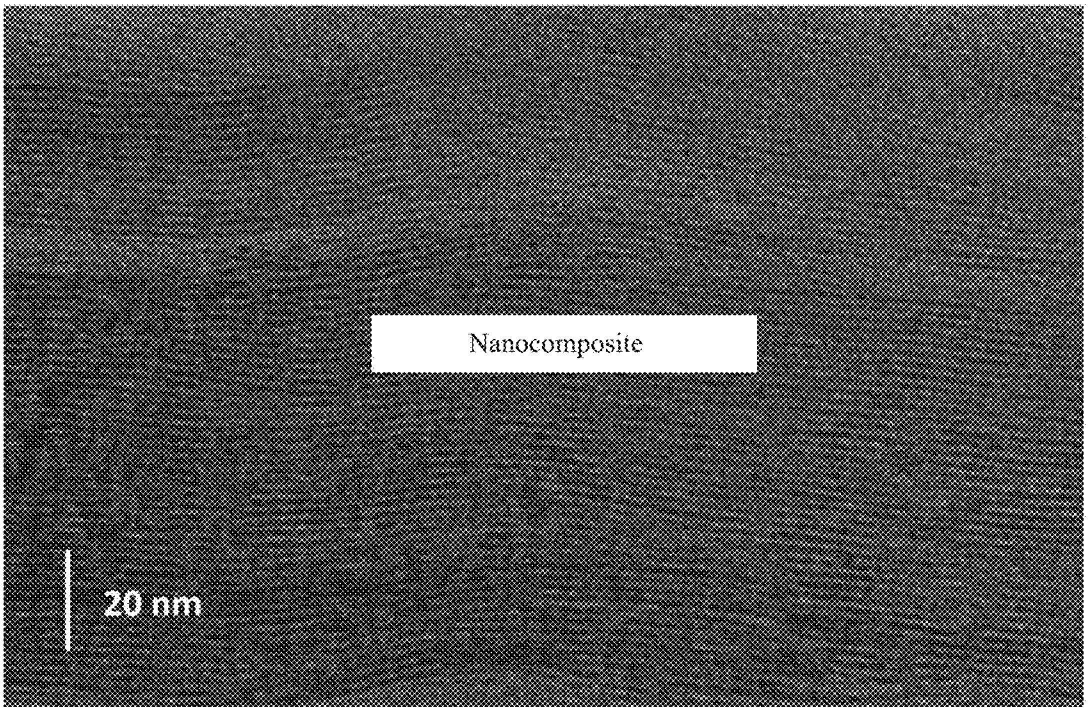
FIG. 6 shows a cross-sectional image obtained via transmission electron microscopy (TEM) of the water-dispersible nanocomposite barrier according to the present invention, showing the orderly spaced hydrophilic hectorite nanoplatelets (1 nm thick darker lines) and intercalated polyethylene glycol (PEG) filler (0.8 nm thick brighter lines) at the nanometric scale (<100 nm).

FIG. 6 shows a cross-sectional image obtained via transmission electron microscopy (TEM) of one embodiment of the water-dispersible nanocomposite barrier according to the present invention, wherein the basal spacing measured via XRD is equal to 18 Å, showing orderly spaced hydrophilic hectorite nanoplatelets (10 Å thick darker lines) and intercalated polyethylene glycol (PEG) filler (8 Å thick brighter lines), regularly repeated at the nanometric scale.

Nanoplatelets are plate-like nanoparticles characterized by high aspect ratio between the diameter and the orthogonal height. The high aspect ratio enables a "brick wall' to be formed where nanoplatelets lay down parallel to the surface of the underlying water-soluble polymeric layer, overlapping each other and laying on top of each other, thus lowering drastically the migration of molecules, whether gaseous or liquid, through the nanoplatelets layer. The higher the aspect ratio, the higher the barrier performance that can be obtained. Typical aspect ratio for montmorillonite exfoliated nanoplatelets is about 100 or more (Cadène et all, JCIS 285(2):719-30 Jun. 2005).

The water-dispersible nanocomposite barrier layer 30 according to the present invention may be optically opaque, preferably translucent, even more preferably transparent, depending on the nanocomposite material (nanoplatelets exfoliation level, polymeric intercalation between the nanoplatelets, impurities level) and the nanocomposite application process (nanocomposite orientation).

Preferably, the water-dispersible nanocomposite barrier layer 30 is flexible. When converting the paper laminate of the present disclosure through a line for printing, sheeting, slitting, rewinding and other typical converting operations, or when making articles such as pouches, comprising the paper laminate of the present disclosure, the entire structure is typically folded, bent and sometimes stretched slightly. This can cause defects in the barrier layer reducing the barrier performance. It is thus preferred that the barrier layer 30 is somewhat flexible and can be stretched without breaking, as the rest of the structure is stretched. Preferably, the barrier layer 30 can be elongated at least 1%, at least 2%, at least 5%, as the paper layer, the adhesive layer and the sealing layer stretch. In some cases, it may be desired for the barrier layer to stretch as much as 10% or even as much as 20%, without breaking. In one embodiment, this is achieved by splitting the water-dispersible nanocomposite barrier layer in multiple distinct water-dispersible nanocomposite barrier sublayers separated by multiple distinct water-soluble polymeric sublayers.

Figure 4:
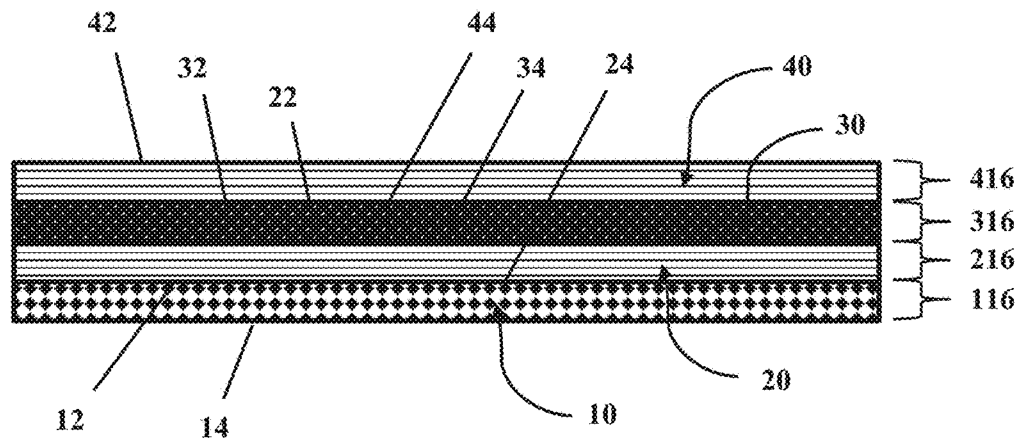
FIG. 4 shows a cross-section of a paper laminate comprising a water-dispersible nanocomposite barrier according to the present invention which comprises a sealing layer 40 coated onto a water-dispersible nanocomposite barrier layer 30 coated onto an adhesive layer 20 coated onto a paper or board layer 10.

FIG. 4 shows a cross-section of a paper laminate of the present disclosure that comprises a paper or board layer 10 having a first surface 12 and a second surface 14 opposite to the first surface 12 and a thickness 116 between the first surface 12 and the second surface 14. To the paper or board layer 10 is attached an adhesive layer 20 with a first surface 22 and a second surface 24 opposite to the first surface 22, and a thickness 216 between the first surface 22 and the second surface 24 and substantially covers at least one of the first surface 12 or the second surface 14 of the paper or board layer 10. To the adhesive layer 20 is attached a water-dispersible nanocomposite barrier layer 30 having a first surface 32 and a second surface 34 opposite to the first surface 32, and a thickness 316 between the first surface 32 and the second surface 34, and substantially covers the second surface 24 of the adhesive layer 20. To the water-dispersible nanocomposite barrier layer is attached a sealing layer 40 with a first surface 42 and a second surface 44 opposite to the first surface 42, and a thickness 416 between the first surface 42 and the second surface 44, and substantially covers the surface 32 of the water-dispersible nanocomposite barrier layer 30. The adhesion between the layers is provided by the interactions between the adhesive layer 20 or the sealing layer 40 and the water-dispersible nanocomposite barrier layer 30.

The thickness of the sealing layer 40 between the first surface 42 and the second surface 44 can range from about 1 μm to about 1000 μm, preferably from about 1 μm to about 200 μm, more preferably from about 1 μm to about 40 μm.

The sealing layer 40 can comprise at least one water-soluble polymer. Depending on the application, the water-soluble polymer(s) can be selected among available options to dissolve in water at 23° C. temperature within seconds, or minutes, or hours. A polymer requiring more than 24 hours to dissolve in water at 23° C. temperature will not be considered as water-soluble.

Each layer according to the present invention is distinct and separated from the others. By distinct, it is meant that the water-dispersible nanocomposite barrier layer 30 within the adhesive layer 20 and the sealing layer 40 comprises substantially the nanocomposite barrier materials only, and that the boundaries between the water-dispersible nanocomposite barrier layer 30 and the surrounding adhesive layer 20 and sealing layer 40 are distinguished by a large composition change over a small distance, creating a sharp boundary that is readily seen by microscopy techniques known in the art. The boundary layer, i.e. the intermediate layer of intermediate composition between the water-dispersible nanocomposite barrier layer and the adjacent adhesive and sealing layers, is no more than 2 μm thick, seen by microscopy techniques known in the art.

Figure 5:
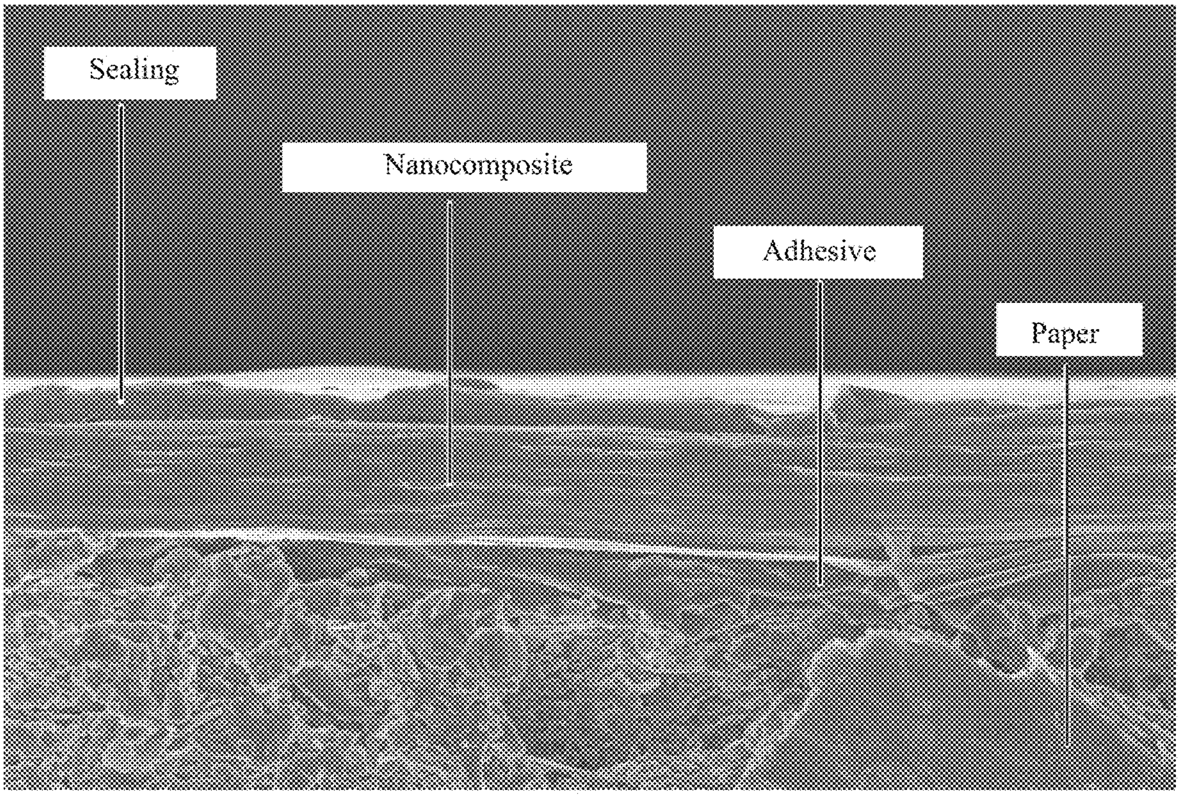
FIG. 5 shows a cross-sectional image obtained via scanning electron microscopy (SEM) of a paper laminate comprising a water-dispersible nanocomposite barrier according to the present invention which comprises a sealing layer 40 coated onto a water-dispersible nanocomposite barrier layer 30 coated onto an adhesive layer 20 coated onto a paper or board layer 10.

FIG. 5 shows a cross-sectional image obtained via Scanning Electronic Microscope (SEM) of a paper laminate of the present disclosure comprising a paper or board layer coated with an adhesive layer, a water-dispersible nanocomposite barrier layer, and a sealing layer.

In one embodiment, the adhesive and sealing layers of the present invention are water-soluble. When immersed in water (e.g. paper recycling process if waste is managed, or aqueous environments if waste is improperly littered), the adhesive and sealing layers will be dissolved and their components digested by bacteria, either in water treatment plants if recycled, or composted in home or industrial composting facilities if collected, or in aqueous environments (rivers, sea) if improperly littered. Without the surrounding and supporting water-soluble adhesive and sealing layers, immersed in water, the water-dispersible nanocomposite barrier layer will break up, and the nanocomposite barrier materials will be digested as organic materials, or will be dispersed as minerals enriching soils, no matter whether the waste is preferably managed or improperly littered. This leaves the paper or board completely uncoated and readily recyclable and/or biodegradable, since the paper or board is preferably selected among recyclable and/or biodegradable grades.

If properly treated in paper recycling systems, the water-soluble adhesive and sealing layers must dissolve readily when stirred into large volumes of warm water. For typical current industrial repulping facilities, the paper-based package must fall apart within 5-20-minutes of immersion in warm water under constant vigorous stirring.

If improperly littered in the environment, the water-soluble adhesive and sealing layers must also fall apart quickly, thus exposing the maximum surface area to the bacteria responsible for the biodegradation, ensuring full digestion in a reasonable time. Preferably, the package would biodegrade within 6-12 months. And if the paper laminate of the present disclosure is composted, it must undergo full disintegration and digestion according to the established norms.

The paper laminate of the present disclosure may comprise a printed area. Printing may be achieved using standard printing techniques, such as flexographic, gravure, or inkjet printing. The paper laminate of the present disclosure may comprise a surface coating for artwork protection purposes against incidental water, or for matt/gloss effects.

Paper or Board

The cellulose fibers used to make the paper or board may be sourced from softwoods, hardwoods and also non-tree fibers which typically have shorter fibers including bamboo, grass, hemp, kenaf, flax, corn husks, cotton stalks, coffee grounds, bagasse, rice straw, wheat straw, algae, abaca, sabia grass, esparto grass, milkwood floss fibers, pineapple leaf fibers, wood fibers, pulp fibers and others.

The paper or board layer used for making paper laminates according to the present invention is preferably recyclable in typical paper recycling streams and is preferably also biodegradable without leaving any persistent materials in the environment. Indeed, papers and boards are not made from 100% cellulose fibers only, but also contain polymeric binders, mineral sizing agents, whitening agents, surfactants, and other additives. These other ingredients must be selected appropriately to ensure that (a) the paper or board will disintegrate in the repulping unit at a recycler and release the maximum cellulose fibers for making recycled paper or board, or (b) the paper or board will biodegrade if improperly disposed in the environment.

The effectiveness of the recycling process may be determined via recyclable percentage. The recyclable percentage of the paper laminate of the present disclosure is determined via test method PTS-RH:021/97 (draft October 2019) under category II, performed by Papiertechnische Stiftung located at Pirnaer Strasse 37, 01809 Heidenau, Germany. Along with recyclable percentage, the total reject percentage is determined via PTS-RH: 021/97 (draft October 2019) under category II. The total reject percentage of the package material of the present disclosure may be 40 percent or less, 30 percent or less, or 10 percent or less, specifically including all values within these ranges and any ranges formed therein or thereby. For example, the total rejection percentage of the package material of the present disclosure may be from about 0.5 percent to about 40 percent, from about 0.5 percent to about 30 percent, or from about 0.5 percent to about 10 percent, specifically reciting all values within these ranges and any ranges formed therein or thereby.

It is believed that the percent non-recyclable material does not necessarily have a 1:1 correlation to the total reject percentage. For example, dissolvable adhesives and/or coatings are designed to dissolve during the recycling process. It is theorized that these adhesives may not have an impact the total reject percentage; however, they would contribute to the non-recyclable material weight percent.

The test method PTS-RH:021/97 (draft October 2019) under category II also comprises a visual component. Trained screeners inspect one or more sheets of recycled package material for visual imperfections. If the number of visual imperfections is too great, then the package material is rejected. If the number of visual imperfections is acceptable, in accordance with the test method PTS-RH:021/97 (draft October 2019) under category II, then the package material is approved for additional processing. The paper laminate of the present invention may yield an acceptable level of visual imperfections during this step of the method.

The paper laminate of the present disclosure may yield the recyclable percentages mentioned heretofore as well as pass the visual screening method. Thus, the paper laminate of the present disclosure may achieve an overall score or final outcome of "pass" when subjected to the test method PTS-RH:021/97 (draft October 2019) under category II.

It is also worth noting that there is an alternative method for determining the recyclable percentage of the paper laminate of the present disclosure. The test method performed by the University of Western Michigan, called repulpability test method, may provide a percent yield of recyclable material. While there are subtle differences between the repulpability test method performed by Western Michigan and the test method PTS-RH:021/97 (draft October 2019) under category II, it is believed that the percentage yield of the repulpability test method would be similar to the recyclable percentage provided by the method PTS-RH:021/97 (draft October 2019) under category II.

For commercial reasons, it is also important that recyclers can obtain at least 50 percent by weight of cellulose fibers from an incoming batch of paper or board waste. For this reason, it is preferred that the paper or board comprises at least between 50% and 100% by weight of cellulose fibers, more preferably between 65% and 90% by weight of cellulose fibers, most preferably between 75% and 95% by weight of cellulose fibers.

It is contemplated that the paper laminate of the present disclosure while being recyclable may itself comprise recycled material. For example, the paper or board of the present invention may comprise more than 10% by weight, preferably more than 20% by weight, more preferably more than 30% by weight of recycled material, specifically reciting all values within these ranges and any ranges created thereby. The paper or board may comprise virgin or recycled cellulosic fibers or mixtures thereof between 0% and 100%.

The presence of recycled material can be detected from a visual inspection of the package. Typically, manufacturers would advertise the use of recycled materials to demonstrate their eco-friendly profile. To do so, they may utilize a logo, such as a leaf, and words indicating the use of recycled material in the package. Manufacturers may also specify the percentage of recycled material utilized as well, e.g. over 50 percent, over 70 percent, etc.

Visual inspection can be as simple as utilizing the human eye to search for logos about the use of recycled material. Additionally, or alternatively, visual inspection may include microscopy methods such as optical microscopy, scanning electron microscopy or other suitable methods known in the art. For example, package material comprising recycled cellulosic fibers may appear different under a microscope due to the presence of a much broader range of natural fibers than if the package material comprised 100% virgin fibers.

It is preferable that the paper or board is as flat as possible on at least one side, the side that is subsequently coated with an adhesive layer. The paper may be flattened via "sizing", which in the industry means that it is coated with a water-borne polymeric suspension containing various inorganic fillers such as clays, calcium carbonate and/or titanium dioxide, the suspension is then dried and the paper calendered to deliver a flatter surface than before sizing, as the inorganic fillers and binders dry down to fill in the porous and rough surface of the paper. Alternatively, the paper may be machine glazed during the paper manufacturing process via a mechanical ironing/pressing step that sometimes involves heat—in this case the cellulosic fibers are squashed together and flattened in order to densify the paper surface and remove porosity. In some cases, sizing and machine glazing are combined to get an even flatter more perfect surface during paper manufacturing, before subsequently being coated with the adhesive layer. In other cases, a vellum or glassine or tracing paper might be used which are already naturally very flat—such papers are made by a process that densities the paper structure throughout its entire thickness during the manufacturing process and further sizing or glazing is not required.

Examples of paper suitable for making a paper laminate according to the disclosure include but are not limited to Leine Nature® paper (grammage 85 g/m$^2$) from Sappi, a machine glazed paper certified "OK Home Compost"; NiklaSelect V Natural Linen paper (99 g/m$^2$) from Birgl & Bergmeister (Niklasdorf, Austria), a paper sized on one side only; PackPro 7.0 paper (65 g/m$^2$) from Birgl & Bergmeister, a paper sized on both sides; Axello papers from BillerudKorsnäs™ (Solna, Sweden); (including from Axello Tough White paper, 80 g/m$^2$) which has been designed to be tougher than many other papers and so may have some advantages in the distribution chain; SCG Glassine paper (58 g/m$^2$) from SCG/Prepack. Examples of board suitable for making a paper laminate according to the disclosure include but are not limited to Cupforma Natura board (from 170 to 330 g/m$^2$) and Natura board (from 233 to 350 g/m$^2$) from Stora Enso.

As shown in the Table 1 below, these papers pass the paper recycling protocols at both Western Michigan University in the USA and PTS Institute in Germany. These papers also pass the OECD 301B biodegradation screening test by undergoing at least 60% biodegradation within 28 days.

TABLE 1

| Paper Grade | Western Michigan Paper Recycling Protocol | PTS Paper Recycling Protocol | OECD 301B Bio-degradation Test |
|---|---|---|---|
| Leine Nature ® 85 g/m$^2$ Sappi | PASS | PASS | PASS |
| NiklaSelect V Natural Linen 100 g/m$^2$ Birgl & Bergmeister | PASS | PASS | PASS |
| PackPro 7.0 80 g/m$^2$ Birgl & Bergmeister | PASS | PASS | PASS |
| Axello ® Tough White 80 g/m$^2$ BillerudKorsnas | PASS | PASS | PASS |

TABLE 1-continued

| Paper Grade | Western Michigan Paper Recycling Protocol | PTS Paper Recycling Protocol | OECD 301B Bio-degradation Test |
|---|---|---|---|
| Glassine 58 g/m$^2$ SCG Packaging | Not tested (passed internal SCG recycling protocols) | Not tested (passed internal SCG recycling protocols) | PASS |

To withstand the stress of high-speed manufacturing processes (where products are placed within packages made from paper laminate of the present disclosure) as well as the stress of shipment, the paper layer must be sufficiently strong and resilient. There are myriad of ways to specify the paper layer. The metrics discussed below are MD tensile strength in kN/m, CD tensile strength in kN/m, MD stretch in percent, CD stretch in percent, MD burst strength in kPa, caliper in μm, MD tensile energy absorption in J/g, CD tensile energy absorption in J/g, and grammage in g/m$^2$. Whilst all the metrics may be utilized in conjunction to select a suitable paper in the present invention, some metrics alone or in conjunction with others may suffice as well.

In cases where it is necessary to use a very tough paper to maintain the physical integrity of the water-dispersible nanocomposite barrier layer, Axello® papers from BillerudKorsnäs are preferred. As an example, Table 2 below shows the properties of Axello® Tough White paper grade from BillerudKorsnäs or Advantage Smooth White Strong from Mondi.

TABLE 2

| Property | Method | Unit | Orientation | Axello ® Tough White | Advantage Smooth White Strong |
|---|---|---|---|---|---|
| Basis Weight | ISO536 | g/m$^2$ | — | 80 | 70 |
| Caliper | ISO536 | μm | — | n/a | 89 |
| Tensile | ISO1924-3 | kN/m | MD | 7.6 | 5.9 |
| Strength | | | CD | 4.7 | 3.0 |
| Maximum | ISO 1924-3 | % | MD | 4.5 | 2.5 |
| Stretch | | | CD | 8.0 | 8.0 |
| Tensile Energy | ISO1924-3 | J/g | MD | 185 | n/a |
| Absorption | | | CD | 240 | n/a |
| Burst Strength | ISO2758 | kPa | MD | 480 | 256 |

Water-Dispersible Nanocomposite

A nanocomposite comprises orderly spaced hydrophilic nanoplatelets and intercalated polymeric fillers at the nanometric scale, wherein the basal spacing measured via XRD is lower than 100 Å, preferably lower 60 Å, more preferably lower than 20 Å.

Nanoplatelets are solid plate-like nanoparticles characterized by high aspect ratio between the diameter and the orthogonal height. High aspect ratio delivers a parallel arrangement of the nanoplatelets, and a longer diffusion path length for chemicals through the nanoplatelets, thus delivering barrier functionality. It is desirable that nanoplatelets are free from defects such as cracks and holes lowering the barrier performance. It is also desirable that nanoplatelets are easily exfoliated in water, both for application purpose (e.g. wet coating) and end-of-life scenarios (e.g. wastewater treatment plants), but highly cohesive when dried. Nanoplatelets are currently used in the industry as rheological modifier, flame retardant, anticorrosion coating and/or chemical barrier. Nanoplatelets can be obtained from natural sources and used as such, or can purified and modified from natural sources, or can be synthetised in furnaces for purity and performance reasons.

Natural phyllosilicates, such as serpentine, clay, chlorite and mica, consist of nanoplatelets stacked together. Natural clays, such as smectites and vermiculites, consist of nanoplatelets stacked together, swelling in presence of water. Smectites, such as montmorillonite and hectorite, consist of nanoplatelets stacked together, swelling the most in presence of water. Natural smectites can be purified and modified, such as sodium cloisite from BYK, obtained from bentonite, a natural mineral containing 60-80% montmorillonite, and cationic exchanged with monovalent sodium for exfoliation purposes. Smectites can be also synthetised, such as laponite from BYK, and sodium hectorite from the University of Bayreuth.

Water-Soluble Polymers

In some embodiments, the adhesive layer and/or the sealing layer are made from water-soluble polymers. Such water-soluble polymers are selected from polyvinyl alcohol (PVOH), polyvinyl alcohol copolymers such as butenediol-vinyl alcohol copolymers (BVOH), which are produced by copolymerization of butenediol with vinyl acetate followed by the hydrolysis of vinyl acetate, suitable butenediol monomers being selected from 3,4-diol-1-butene, 3,4-diacyloxy-1-butenes, 3-acyloxy-4-ol-1-butenes, 4-acyloxy-3-ol-1-butenes and the like; polyvinyl pyrrolidone; polyalkylene oxides, such as polyethylene oxides or polyethylene glycols (PEG); poly(methacrylic acid), polyacrylic acids, polyacrylates, acrylate copolymers, maleic/acrylic acids copolymers; polyacrylamide; poly(2-acrylamido-2-methyl-1-propanesulfonic acid (polyAMPS); polyamides, poly-N-vinyl acetamide (PNVA); polycarboxylic acids and salts; cellulose derivatives such as cellulose ethers, methylcellulose, hydroxyethyl cellulose, carboxymethylcellulose; hydroxypropyl methylcellulose; natural gums such as xanthan and carrageenan gum; sodium alginates; maltodextrin, low molecular weight dextrin; polyamino acids or peptides; proteins such as casein and/or caseinate (e.g. such as those commercialized by Lactips).

Preferred water-soluble polymers are polyvinyl alcohol, polyethylene oxide, methylcellulose and sodium alginate. For applications where a "plastic free" product is desired, the water-soluble polymer layer may be a naturally derived water-soluble polymer, such as sodium alginate. Preferably, the level of polymer in water-soluble adhesive and sealing layers is at least 60%.

The water-soluble polymer has an average molecular weight (measured by gel permeation chromatography) of about 1,000 Da to about 1,000,000 Da, or any integer value from about 1,000 Da to about 1,000,000 Da, or any range formed by any of the preceding values such as about 10,000 Da to about 300,000 Da, about 20,000 Da to about 150,000 Da, etc. More specifically polyvinyl alcohol would have a molecular weight in the range of 20,000-150,000 Da. Polyethylene oxide would have a molecular weight in the range of 50,000 Da to 400,000 Da. Methylcelluloses would have a molecular weight in the range 10,000 Da to 100,000 Da. Sodium alginate would have a molecular weight in the range 10,000 to 240,000 Da.

If homopolymer polyvinyl alcohol is used, the degree of hydrolysis could be 70-100%, or any integer value for percentage between 70% and 100%, or any range formed by any of these values, such as 80-100%, 85-100%, 90-100%, 95-100%, 98-100%, 99-100%, 85-99%, 90-99%, 95-99%, 98-99%, 80-98%, 85-98%, 90-98%, 95-98%, 80-95%, 85-95%, 90-95%, etc.

Optional Ingredients

The adhesive and sealing layers of the paper laminate of the present disclosure may contain disintegrants, plasticizers, surfactants, lubricants/release agents, fillers, extenders, antiblocking agents, detackifying agents, antifoams, or other functional ingredients.

It may be required for certain applications that the adhesive and sealing layers of the present disclosure contain disintegrants to increase their dissolution rate in water. Suitable disintegrants are, but are not limited to, corn/potato starch, methyl celluloses, mineral clay powders, croscarmellose (cross-linked cellulose), crospovidone (cross-linked polyvinyl N-pyrrolidone, or PVP), sodium starch glycolate (cross-linked starch). Preferably, the adhesive and sealing layers comprise between 0.1% and 15%, more preferably from about 1% to about 15% by weight of disintegrants.

In some embodiments, the adhesive and sealing layers of the present disclosure may contain water-soluble plasticizers. Preferably, the water-soluble plasticizer is selected from water, polyols, sugar alcohols, and mixtures thereof. Suitable polyols include polyols selected from the group consisting of glycerol, diglycerol, ethylene glycol, diethylene glycol, triethylene glycol, tetraethylene glycol, polyethylene glycols up to 400 Da molecular weight, neopentyl glycol, 1,2-propylene glycol, 1,3-propanediol, dipropylene glycol, polypropylene glycol, 2-methyl-1,3-propanediol, methylene glycol, trimethylolpropane, hexylene glycol, neopentyl glycol, and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. In some cases, the plasticizer could be selected from the following list: ethanolamine, alkyl citrate, isosorbide, pentaerythritol, glucosamine, N-methylglucamine or sodium cumene sulfonate. Less mobile plasticizers such as sorbitol or polyethylene oxide can facilitate the formation of water-soluble polymeric layers with greater barrier properties than water-soluble polymeric layers including a more mobile plasticizer such as glycerol. In some circumstances when there is a desire to use as many naturally derived materials as possible, the following plasticizers could also be used: vegetable oil, polysorbitol, dimethicone, mineral oil, paraffin, $C_1$-$C_3$ alcohols, dimethyl sulfoxide, N, N-dimethylacetamide, sucrose, corn syrup, fructose, dioctyl sodium-sulfosuccinate, triethyl citrate, tributyl citrate, 1,2-propylene glycol, mono, di- or triacetates of glycerin, natural gums, citrates, and mixtures thereof. More preferably, water-soluble plasticizers are selected from glycerol, 1,2-propanediol, 20 dipropylene glycol, 2-methyl-1,3-propanediol, trimethylolpropane, triethylene glycol, polyethylene glycol, sorbitol, or a mixture thereof, most preferably selected from glycerol, sorbitol, trimethylolpropane, dipropylene glycol, and mixtures thereof. Preferably, the water-soluble polymeric layers comprise between 5% and 50%, more preferably between 10% and 40%, even more preferably from about 12% to about 30% by weight of plasticizers.

In some embodiments, the adhesive and sealing layers of the present disclosure comprises a surfactant. Suitable surfactants may belong to the non-ionic, cationic, anionic or zwitterionic classes. Suitable surfactants are, but are not limited to, poloxamers (polyoxyethylene polyoxypropylene glycols), alcohol ethoxylates, alkylphenol ethoxylates, tertiary acetylenic glycols and alkanolamides (nonionic), polyoxyethylene amines, quaternary ammonium salts and quaternized polyoxyethylene amines (cationic), and amine oxides, N-alkylbetaines and sulfobetaines (zwitterionic).

Other suitable surfactants are dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of 5 fatty acids, and combinations thereof. Preferably, the water-soluble polymeric layers comprise between 0.1% and 2.5%, more preferably from about 1% to about 2% by weight of surfactants.

In some embodiments, the adhesive and sealing layers of the present disclosure comprises lubricants/release agents. Suitable lubricants/release agents are, but are not limited to, fatty acids and their salts, fatty alcohols, fatty esters, fatty amines, fatty amine acetates and fatty amides. Preferred lubricants/release agents are fatty acids, fatty acid salts, fatty amine acetates, and mixtures thereof. Preferably, the water-soluble polymeric layers comprise between 0.02% to 1.5%, more preferably from about 0.1% to about 1% by weight of lubricants/release agents.

In some embodiments, the adhesive and sealing layers of the present disclosure comprises fillers, extenders, antiblocking agents, detackifying agents. Suitable fillers, extenders, antiblocking agents, detackifying agents are, but are not limited to, starches, modified starches, crosslinked polyvinylpyrrolidone, crosslinked cellulose, microcrystalline cellulose, silica, metallic oxides, calcium carbonate, talc and mica. Preferably, the water-soluble polymeric layers comprise between 0.1% to 25%, more preferably from about 1% to about 15% by weight of fillers, extenders, antiblocking agents, detackifying agents. In absence of starch, the water-soluble polymeric layers comprise preferably between 1% to 5% by weight of fillers, extenders, antiblocking agents.

In some embodiments, the adhesive and sealing layers of the present disclosure comprises antifoams. Suitable antifoams are, but are not limited to, polydimethylsiloxanes and hydrocarbon blends. Preferably, the water-soluble polymeric layers comprise between 0.001% and 0.5%, more preferably from about 0.01% to about 0.5% by weight of antifoams.

Water-Insoluble Biodegradable Polymers

In some embodiment, the sealable layer is made from water-insoluble biodegradable polymers.

In one instance, biodegradable aliphatic polyesters and copolyesters can be produced by large-scale bacterial fermentation. Collectively termed polyhydroxyalkanoates, also known as "PHAs", these polymers can be harvested from plant or bacteria fed with a particular substrate, such as glucose, in a fermentation plant. In many instances, the structural or mechanical properties of PHAs can be customized to fit the specifications of the desired application. PHAs and their copolymers can degrade both aerobically and anaerobically. This makes them particularly well suited for composting or rapidly and completely degrading in the environment. Such bioplastics are typically suspended in aqueous emulsions and can be dried into films on various substrates, although they can also be extruded into films and coatings.

The PHA can be obtained as copolymers that are commercialized as film grades for extrusion and blowing from ShenZhen Ecomann Biotechnology Co., Danimer Scientific, Inc., which produces poly(beta-hydroxyalkanoate), poly(3-hydroxybutyrate-co-3-hydroxyhexanoate) NODAX™), or Kaneka which produces poly(3-hydroxybutyrate-co-3-hydroxyhexanoate). Non-limiting examples of PHA copolymers include those described in U.S. Pat. No. 5,498,692. Other PHA copolymers can by synthesized by methods known to one skilled in the art, such as, from microorganisms, the ring-opening polymerization of beta-lactones, the dehydration-polycondensation of hydroxyalkanoic acid, and the dealcoholization-polycondensation of the alkyl ether of hydroxyalkanoic acid, as described in Volova, "Polyhydroxy Alkanoates Plastic Materials of the 21" Century: Production, Properties, and Application, Nova Science Publishers, Inc., (2004), incorporated herein by reference.

Other possible biodegradable water-insoluble polymers could include biodegradable thermoplastic material selected from: the group consisting of aliphatic aromatic polyesters, such as polybutylene adipate terephthalate (PBAT) trade as Ecoflex® from BASF (Germany), or biodegradable blends of polybutylene adipate terephthalate (PBAT) and polylactic acid (PLA) traded as ECOVIO® from BASF (Germany); the group of thermoplastic starches, such as blends of aliphatic polyesters and starch traded as Mater-Bi from Novamont (Italy) or from Plantic (Australia); the group of polybutylene succinate adipate (PBSA) traded as BioPBS™ from Mitsubishi Chemicals (Japan).

Methods of Making a Nanocomposite Barrier Paper Laminate

Figure 7:
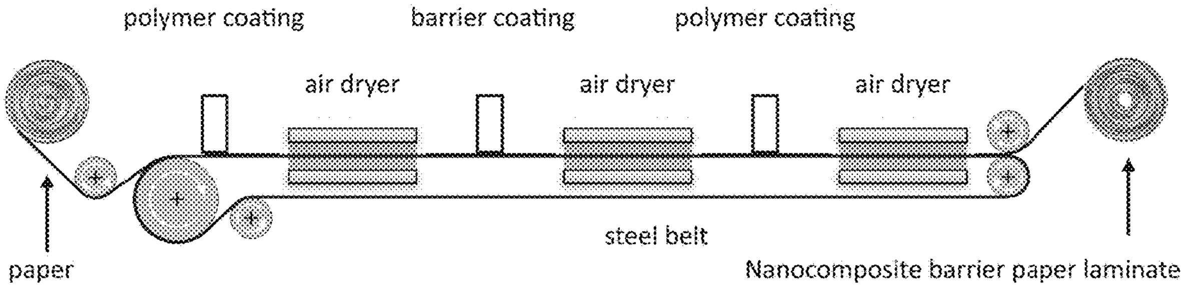
FIG. 7 shows a schematic representation of a method of making a paper laminate comprising a water-dispersible nanocomposite barrier according to the present invention.

There are numerous non-limiting embodiments of the method of making the paper laminate comprising a water-dispersible nanocomposite barrier described herein. As shown in FIG. 7, a paper laminate comprising a water-dispersible nanocomposite barrier may be produced in multiple steps of coating and drying of water-borne dispersions, under specific conditions.

In one non-limiting embodiment, the method of making the paper laminate comprising a water-dispersible nanocomposite barrier consists of:

a) applying a first water-borne polymeric dispersion onto the surface of a paper or board layer 10, surface being sized, glazed, or both sized and glazed
b) removing the water from the polymeric dispersion to obtain an adhesive layer 20
c) applying a water-borne nanocomposite dispersion onto the surface of the adhesive layer 20
d) removing the water from the nanocomposite dispersion to obtain a water-dispersible nanocomposite barrier layer 30
e) applying a second water-borne polymeric dispersion onto the surface of the water-dispersible nanocomposite barrier layer 30
f) removing the water from the second polymeric dispersion to obtain a sealing layer 40

This method offers better bonding strength between the paper or board layer 10 and the water-dispersible nanocomposite barrier layer 30. It is also simpler to practice from an industrial standpoint. But it limits the selection of papers or boards to those suitable for coating water-borne dispersions, such as those that are sized on at least one side, or are machine glazed on at least one side, or are vellum or glassine papers. In some cases, sizing and machine glazing may be combined to make an even flatter surface of the paper or board.

In another non-limiting embodiment, the method of making the paper laminate comprising a water-dispersible nanocomposite barrier consists of:

a) applying a water-borne nanocomposite dispersion onto the surface of a sealable film 40
b) removing the water from the nanocomposite dispersion to obtain a water-dispersible nanocomposite barrier layer 30
c) applying a water-borne polymeric dispersion onto the surface of the water-dispersible nanocomposite barrier layer 30 d) removing the water from the polymeric dispersion to obtain an adhesive layer 20 e) laminating a paper or board layer 10 onto the surface of the adhesive layer 20

This method offers better performing barrier performance as sealable films can be manufactured with perfectly flat surfaces. It also offers the advantage to be quite insensitive to the porosity and surface roughness of the paper or board layer. It is therefore possible to obtain paper laminates comprising a water-dispersible nanocomposite barrier according to this method starting from paper or board layers that are neither surface glazed nor sized.

To make the adhesive layer 20 and/or the sealing layer 40 from water-borne polymeric dispersions, the starting materials must be dissolved or dispersed in water first. The resulting water-borne polymeric dispersion would typically contain 20% to 40% solids, depending on the coating process selected for the application. The water-borne polymeric dispersion is then coated onto a given substrate and the water is removed via IR, convective, or diffusive drying processes.

Without being limited to theory, it is believed that the most important material properties of water-borne polymeric dispersions are: a) the solids content at given temperature between 20-95° C.; b) the resulting viscosity of the water-borne polymeric dispersion at that temperature, higher viscosity being better for maximum distinction/separation between the layers; c) the wetting of the water-borne polymeric dispersion either onto a flat paper or board, or onto a water-dispersible nanocomposite barrier layer, higher wetting being better.

To make water-dispersible nanocomposite barrier layer 30, a water-borne nanocomposite dispersion is typically formed by taking the water-dispersible nanoplatelets as solid form and let them exfoliate in water first. The water-borne nanoplatelets dispersion is then further combined with an aqueous polymeric solution under moderate stirring. The resulting water-borne nanocomposite dispersion would typically contain 1% to 10% solids, depending on the coating process selected for the application. The water-borne nanocomposite dispersion is then coated onto a given substrate and the water is then removed via IR, convective, or diffusive drying processes.

Without being limited to theory, it is believed that the most important material property of the nanocomposite are: a) the aspect ratio of the nanoplatelets (the higher aspect ratio being the better for barrier performance); b) the total exfoliation and dispersion of the nanoplatelets in water, to maximise the barrier performance; c) the choice of the polymeric filler, and the weight ratio between the nanoplatelets and the polymeric filler, to minimise the basal spacing between the nanoplatelets without phase separation, thus maximising the barrier performance.

Without being limited to theory, it is also believed that the most important processability properties of water-borne nanocomposite dispersions are: a) the viscosity of the water-borne nanocomposite dispersion, higher viscosities being better for maximum distinction/separation between the layers and therefore maximum barrier performance; b) the wetting of the water-borne nanocomposite dispersion onto the adhesive layer, or onto another water-dispersible nanocomposite layer, or onto the sealing layer; c) the shear applied on the water-borne nanocomposite dispersion, the higher being the better for parallel nanoplatelets orientation to the barrier plane; d) the water removal from the dispersion via diffusive drying without generating defects such as pinholes or cracks in the nanocomposite barrier layer.

Many processes were tested for coating water-borne nanocomposite dispersions: wire rod coating, anilox roll coating, reverse roll coating, slot die extrusion coating, roll-to-roll coating and spray coating. Aqueous extrusion coating via tailored slot die (e.g. FMP Technology, Coatema) proved the most reliable processes provided proper infeed of the water-borne nanocomposite dispersion. Coating processes delivering superior shearing of the aqueous nanocomposite dispersion are preferred, as superior shearing delivers superior parallel orientation of the nanoplatelets within the nanocomposite barrier layer, thus resulting in superior barrier performance. That barrier performance is nonetheless also dependent to the overall thickness of the water-dispersible nanocomposite barrier layer. Typically, the thickness of the water-dispersible nanocomposite barrier layer is in the range 0.1 μm to 10 μm to provide an adequate barrier performance whilst maintaining sufficient mechanical flexibility and mechanical resistance.

In another non-limiting embodiment of the method, the water-dispersible nanocomposite barrier layer 30 is obtained in multiple application steps of coating and drying the water-borne nanocomposite dispersion, each nanocomposite sublayer masking hypothetical defects in the underlaying nanocomposite sublayer, thus delivering maximum barrier performance. To do so, a first water-dispersible nanocomposite barrier sublayer is formed onto the adhesive layer 20 according to any of the above-mentioned methods; Subsequently, one or more additional water-dispersible nanocomposite barrier sublayers may be added until the desired water-dispersible nanocomposite layer thickness is obtained. Following this method, relatively thick water-dispersible nanocomposite layer can be formed. Where increased optical transparency and mechanical flexibility is desired, the additional water-dispersible nanocomposite barrier sublayers can be separated by additional thin water-soluble polymeric sublayers. The various polymeric or barrier sublayers may have substantially the same chemical composition or a different one, to deliver different properties to the overall structure. The adhesion between the sublayers is solely provided by the molecular interactions between the water-soluble polymeric sublayers and the water-dispersible nanocomposite barrier sublayers. Similarly, the cohesion among the water-dispersible nanocomposite barrier sublayers is solely provided by the molecular interactions among the nanocomposite barrier materials.

The drying step is typically performed by conveyor dryers, such as those commercialized by Krönert under the brand name Drytec, by Coatema under the brand name ModulDry and/or by FMP Technologies GmbH (Erlangen, Germany) under the brand name SenDry or PureDry. In some embodiments, the drying substrate is guided through the hot air tunnel by a running belt (belt dryers), by multiple idlers (rolling dryers) or by multiple hot air nozzles (floatation dryers). Without being limited to theory, it is believed that the most important parameters of the drying process are:

a) the residence time of the drying substrate into the hot air tunnel, typically about 50 s for 60μ thick water-borne polymeric dispersion where the polymer is water-soluble containing 25% solids;

b) the temperature profile of the hot air in the tunnel, typically up to about 95° C.; c) the velocity of the hot air flowing above the substrate, typically about 25 m/s. The heating system can be electrical, thermal oil, steam or gas-fire based.

The paper laminate of the present disclosure may contain residual moisture depending on the hygroscopy and the isotherm of the paper laminate components at given temperature and humidity conditions measured by Karl Fischer titration. For instance, paper may contain about 3-5% residual moisture at 23° C. and 50% r.H.

Inks, Branding & Decoration

The paper laminate of the present disclosure may be opaque or translucent. The paper laminate of the present disclosure may comprise a printed area. Printing may be achieved using standard printing techniques, such as flexographic, gravure, or inkjet printing.

The paper laminate of the present disclosure may be arranged as a package in a myriad of configurations. For example, the package may comprise a plurality of panels which enclose a plurality of articles. Each of these panels comprises an inner surface and an outer surface. The outer surface and/or inner surface of one or more panels may comprise ink or dyes which create branding on the package, package information, and/or background color, etc. The branding and/or other package information associated with the product within the package is provided on the outer surface of at least one panel. Branding can include logos, trade names, trademarks, icons, and the like associated with the product within the package. Branding is utilized to inform a consumer of the product within the package. Package information can include the size of the product, the number of products within the package, an exemplary image of the products contained within the package, recyclability logos, and the like associated with the products within the package.

In all aspects of the invention, the ink that is deposited can be either solvent-based or water-based and the pigments within the ink may be either organic or inorganic, or a combination of both. In some embodiments, the ink is highly abrasion resistant. For example, the high abrasion resistant ink can include coatings cured by ultraviolet radiation (UV) or electron beams (EB). In some embodiments, any organic pigments within the ink are derived from a petroleum source. In some embodiments, any organic pigments within the ink are derived from a renewable resource, such as soy, a plant. In some embodiments, any organic pigments within the ink will be biodegradable if the pigment is organic. In other embodiments, any inorganic pigments within the ink will be made from an inorganic metal oxide that is dispersible and not harmful to the environment.

Non limiting examples of inks include ECO-SUREI™ from Gans Ink & Supply Co. and the solvent based VUTEk® and BioVu™ inks from EFI, which are derived completely from renewable resources (e.g., corn). Others include SunVisto AquaGreen from Sun Chemicals (Parsippany-Troy Hills, New Jersey).

The ink is present in a thickness of about 0.5 μm to about 20 μm, preferably about 1 μm to about 10 μm, more preferably about 2.5 μm to about 3.5 μm.

The paper laminate of the present disclosure may comprise inks and/or dyes to provide a background color to the packages of the present disclosure. To further clarify the background color, it is worth noting that the paper or board layer comprises a base color. A base color of the paper or board layer is the color of the package without inks or dyes. For example, bleached paper is white in color, unbleached is brown in color, grass-derived paper is green in color and paper which includes recycled content is grey in color. A background color is any color that is not a base color, e.g. blue, red, green, yellow, purple, orange, black, or combinations thereof. However, background color can also include white, brown, or grey, if the color is achieved via inks and/or dyes.

In order to reduce the use of inks/dyes for the benefit of the recycling process, the natural colour of the paper or board layer may be utilized. For example, inks/dyes may be used to define the background colour of the consumer-facing panel only, whereas the natural colour of the paper or board layer would be used as background colour for the other panels of the flexible package.

Surface Coating

Preferably, the printed surface of the paper laminate of the present disclosure is surface coated to protect the ink layer from its physical and chemical environment, to increase the durability of the paper layer and to provide a glossy or matte finish. This optional surface coating may be called a lacquer or a varnish or a splash-resistant layer. In some embodiments, the surface coating is made from a nitrocellulose lacquer, an acrylic lacquer, a water-based lacquer, a reactive two-components polyurethane lacquer. In some preferred embodiments, the surface coating is made from natural waxes passing the OECD301B biodegradation screening test, such as bee wax, rapeseed wax or candelilla wax, provided that the temperature of exposure is not exceeding the wax melting point. Because the thickness of the surface coating affects the recyclability and the biodegradation of the package made from the paper laminate of the present disclosure, thinner surface coating is preferred. The thickness of the surface coating is preferably between 1 μm to 25 μm, more preferably below 10 μm, even more preferably below 5 μm.

Method of Making a Nanocomposite Barrier Paper Laminate Package

The paper laminate comprising a water-dispersible nanocomposite barrier described herein can be formed into articles, including but not limited to those in which typical film or sealable paper would be used as a packaging material. Such articles include, but are not limited to pouches, sachets, bags, flow-wraps, pillow bags and other containers. Pouches, sachets, bags, flow-wraps, pillows, and other such containers that incorporate the paper laminate comprising a water-dispersible nanocomposite barrier described herein can be made in any suitable manner known in the art.

The paper laminate of the present disclosure can be converted into the packages and articles using a form-fill-seal process (FFS). A traditional FFS process typically involves three successive steps where the package or article is formed from the paper laminate, filled, and then sealed or closed, as described in U.S. Pat. No. 6,293,402, which is incorporated herein for reference. In heat sealing methods, a temperature range exists above which the seal would be burnt, and below which the seal would not be sufficiently strong. Seals are provided by any sealing means known to one skilled in the art. Sealing can comprise the application of a continuously heated element to the paper laminate, and then removing the element after sealing. The heating element can be a hot bar that includes jaws or heated wheels that rotate. Different seal types include fin seals and overlap seals.

Single-Lane Process

A well-known sealing single lane process using a vertical form and fill machine is described in U.S. Pat. No. 4,521,437, incorporated herein by reference. In this process, a flat web of material is unwound from a roll and formed into a continuous tube by sealing the longitudinal edges on the film together to form a lap seal (i.e. fin seal). The resulting tube is pulled vertically downwards to a filling station, and collapsed across a transverse cross-section of the tube, the position of such cross-section being at a sealing device below the filling station. A transverse heat seal is made by the sealing device at the collapsed portion of the tube, thus making an air-tight seal across the tube. After making the transverse seal, a pre-set volume of material to be packaged, e.g. flowable material, enters the tube at the filling station, and fills the tube upwardly from the aforementioned transverse seal. The tube is then dropped a predetermined distance under the influence of the weight of the material in the tube, and of the film advance mechanism on the machine. The jaws of the sealing device are closed, collapsing the tube at a second transverse section, which is above the air/material interface in the tube. The sealing device seals and severs the tube transversely at said second transverse section. The material-filled portion of the tube is now in the form of a pillow shaped sachet. Thus, the sealing device has sealed the top of the filled sachet, sealed the bottom of the next-to-be-formed sachet, and separated the filled sachet from the next-to-be-formed sachet, all in one operation.

Multi-Lane Process

The packages of the present disclosure can also be processed using a multi-lane sachet packaging machine, such as the VEGA PACK300S by QuadroPack (Nijeveen, Netherlands). A high-speed, multi-lane sachet processing machine is also described in U.S. Pat. No. 6,966,166, incorporated herein for reference. The machine used in this process includes two rolls for dispensing sheets of webbed film of equal dimensions, a plurality of sealing devices appropriate for such a substrate and means, such as the pump station described below for inserting contents (e.g. liquid, viscous materials, powders & other substances) into the film packages. A plurality of packages can be produced by utilizing one or more moveable reciprocating carriages that travel with the flow of film through the machine, the carriages supporting each of the sealing and cross-cutting stations. The sealing devices are applied to all but one of the edges, forming a pouch with a cavity and an opening. The desired contents of the package are inserted into the cavity through the opening. The opening is then sealed and separated from the substrate. A pair of substrate rolls is provided at the substrate roll station. Alternatively, a cutter can be placed at a middle of a single nip roller to divide the substrate width into two equal parts. Sheets of paper laminates are advanced through the apparatus by the pull-wheel station and used to form the front and back panels of the package. The paper laminate from each roll is guided so that the two sheets of paper laminate are in close proximity to, and in a parallel relationship with, one another when they are advanced through the machine. The sealing and cutting devices include: longitudinal sealing bars to seal the package's vertical sides, a unidirectional roller to hold the paper laminate in position and prevent it from sliding backward, a vertical cutter to cut a tear-off slit into the package in the vertical direction, and cross-sealing bars to seal the packages in horizontal direction. The pump station comprises of a plurality of fill dispensers in communication with a storage structure containing the consumer product into the package. These dispensers can draw a pre-determined quantity of consumer product from a reservoir and depositing it into the cavities of the paper laminate packages formed by the machine. In the preferred embodiment, the pump station and dispensers may be driven by one or more motion-controlled servomotors in communication with the cam system. The quantity of consumer product may be changed by exchanging the dispensers (with different dispensers having different capacity), changing the stroke of the pump cycle, changing the timing of the pump cycle, and the like. Therefore, different quantities of consumer products can be dispensed, depending upon the size and capacity of the packages to be formed by the machine.

The sealing mechanism can be thermal heat sealing, water sealing, moisture sealing, ultrasonic sealing, infrared sealing, or any other type of sealing deemed suitable.

Articles of Manufacture

Figure 8:
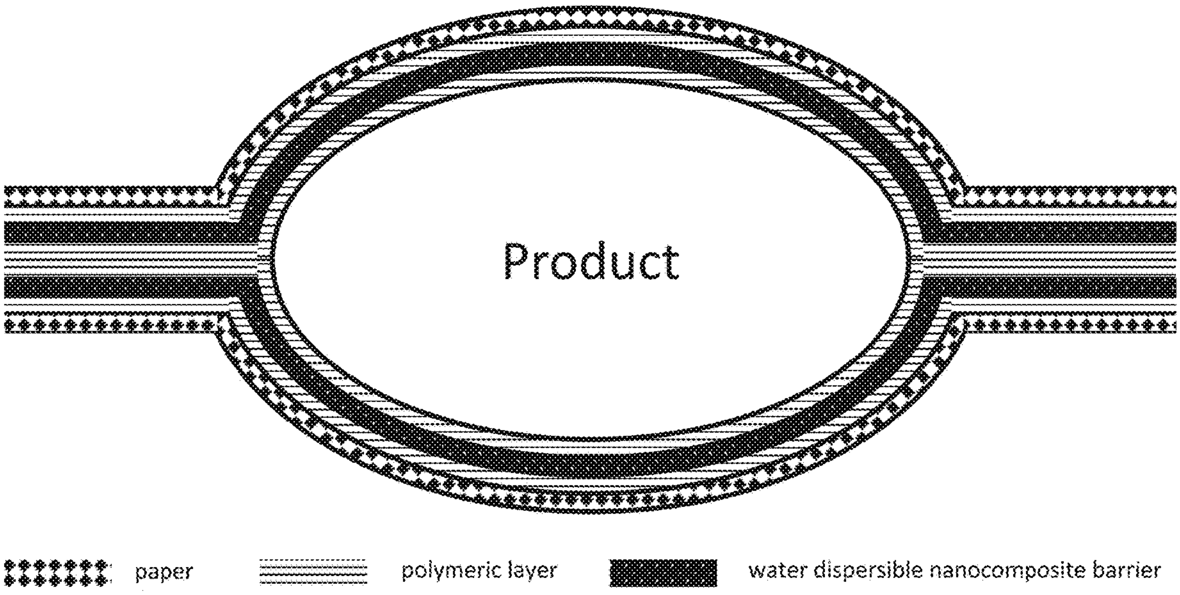
FIG. 8 shows a schematic representation of an application of a paper laminate comprising a water-dispersible nanocomposite barrier according to the present invention.

As shown in FIG. 8, the present disclosure includes articles comprising a product composition and a paper laminate comprising a water-dispersible nanocomposite barrier which may be formed into a container, such as a pouch, a sachet, a capsule, a bag, etc. to hold the product composition. For simplicity, the articles of interest herein will be described in terms of paper laminate pouches, although it should be understood that discussion herein also applies to other types of containers.

The pouches formed by the foregoing methods, can be of any form and shape which is suitable to hold the composition contained therein, until it is desired to release the composition from the paper laminate pouch, such as by ripping it open. The pouches may comprise one compartment, or two or more compartments (that is, the pouches can be multi-compartment pouches). In one embodiment, the paper laminate pouch may have two or more compartments.

In one embodiment, the paper laminate of the present disclosure may be sealed to a film that does not have paper attached. This enables a window into the package to be formed so that the consumer can see the product, without modifying the recyclability of the package.

The pouches or other containers may contain a unit dose of one or more compositions from a range of products that could include (but not limited to) contain a consumer product. As used herein, "consumer product" refers to materials that are used for hair care, beauty care, oral care, health care, personal cleansing, and household cleansing, for example. Nonlimiting examples of consumer products include shampoo, conditioner, mousse, face soap, hand soap, body soap, liquid soap, bar soap, moisturizer, skin lotion, shave lotion, toothpaste, mouthwash, hair gel, hand sanitizer, laundry detergent compositions dishwashing detergent, automatic dishwashing machine detergent compositions, hard surface cleaners, stain removers, fabric enhancers and/or fabric softeners, cosmetics, and over-the-counter medication, electronics, pharmaceuticals, confectionary, pet healthcare products, *cannabis* derived products, hemp derived products, CBD based products, other products derived from drugs other than *cannabis*, vitamins, non-pharmaceutical natural/herbal "wellness" products, razors, absorbent articles, wipes, hair gels, food and beverage, animal food products and new product forms. Typical absorbent articles of the present invention include but are not limited to diapers, adult incontinence briefs, training pants, diaper holders, menstrual pads, incontinence pads, liners, absorbent inserts, pantiliners, tampons, and the like.

The composition inside the pouches can be in any suitable form including, but not limited to: powders, solid foams, fibers, solids, granules, liquids, gels, pastes, creams, capsules, pills, dragees, solid foams, fibers, absorbent articles, nonwovens, etc. The pouches are particularly suitable for dry products, in addition to some pastes, gels, liquids products that contain less than 30% water, more preferably less than 20% water. The packages and articles of the present invention are resistant to the consumer product. As used herein, "resistant" refers to the ability of the packages and articles to maintain their mechanical properties and artwork on their surfaces, as designed, without degradation of the package and article via diffusion of the consumer product through the package material.

Additional product forms (articles) include, disposable aprons, laundry bags, disposable hospital bedding, skin patches, face masks, disposable gloves, disposable hospital gowns, medical equipment, skin wraps, agricultural mulch films, shopping bags, fefill pouch, reloadable component into a durable system, sandwich bags, trash bags, emergency blankets and clothing, building/construction wrap & moisture resistant liners, primary packaging for shipping, such as envelopes and mailers, non-absorbent clothing articles that can be used to encase clothing items, for example dresses, shirts, suits, and shoes.

The different compartments of multi-compartment pouches may be used to separate incompatible ingredients. For example, it may be desirable to separate dry shampoo and dry conditioner, or laundry powder and laundry additives into separate compartments.

Due to improvements in water vapor and oxygen barrier, the dyes and perfumes typically used in some products should have greater stability inside pouches made from paper laminate of the present disclosure compared to pouches made from paper laminate without barrier. Also, it is likely that the barrier against migration of grease, surfactants and other chemistries contained within the packaging will be improved compared to packages made from paper laminate without barrier.

At the end of life of the package, the package may be recycled by the consumer in conventional paper recycling systems. In specific embodiments, the structure will break up in the re-pulping system, enabling the paper fibers to be recovered. The adhesive and sealing layers will dissolve in water and eventually biodegrade. The water-dispersible nanocomposite barrier materials will disperse in water, the organic fraction will dissolve in water and eventually biodegrade, whilst the mineral fraction would sediment as inert, harmless, and compatible material occurring naturally in the environment. However, if littered, the packages will biodegrade within 6-12 months.

In order to facilitate, as well as to encourage the recyclability of the package, the package made from the structure of the present disclosure may comprise less than 50 percent by weight of inks, dyes, barrier layers, polymeric layers, glues and/or synthetic fibers. The weight percentage of inks, inks, dyes, barrier layers, polymeric layers, glues and/or synthetic fibers, in the package can be less than 50 percent by weight, more preferably less than 30 percent by weight, or most preferably less than 10 percent by weight, specifically reciting all values within these ranges and any ranges created thereby. For example, the weight percentage of inks, dyes, barrier layers, polymeric layers, glues and/or synthetic fibers, in the package material can be between 0.1 percent by weight to 50 percent by weight, more preferably between 0.1 percent by weight to 30 percent by weight, or most preferably between 0.1 percent by weight to 10 percent by weight, specifically reciting all values within these ranges and any ranges created thereby. In one specific example, the amount of inks, dyes, barrier layers, polymeric layers, glues and/or synthetic fibers, is 5 percent by weight or less or between 0.1 percent by weight to 5 percent by weight, specifically reciting all values within these ranges and any ranges created thereby.

It is preferred that the resulting overall package made from the paper laminate of the present disclosure comprises at least 50 percent by weight of natural cellulose fibers, at least 70 percent by weight natural cellulose fibers, or at least 90 percent by weight natural cellulose fibers, specifically reciting all values within these ranges and any ranges created thereby.

The recyclability of the package according to the present invention may be determined via recyclable percentage. The paper laminate of the present disclosure may exhibit recyclable percentages of 50 percent or greater, more preferably 70 percent or greater, or most preferably 80 percent or greater, specifically reciting all values within these ranges and any ranges created thereby. The paper laminate of the present disclosure may have a recyclable percentage yield of between 50 percent to about 99 percent, more preferably from about 85 percent to about 99 percent, or most preferably from about 90 percent to about 99 percent.

Test Methods

When testing and/or measuring a material, if the relevant test method does not specify a particular temperature, then the test and/or measure is performed on specimens at 23° C. (±3° C.), with such specimens preconditioned at that temperature. When testing and/or measuring a material, if the relevant test method does not specify a particular humidity, then the test and/or measure is performed on specimens at 35% (±5%), with such specimens preconditioned at that humidity. Testing and/or measuring should be conducted by trained, skilled, and experienced personnel, according to good laboratory practices, via properly calibrated equipment and/or instruments.

1) Water Vapour Transmission Rate (WVTR)

This test method is performed according to ASTM F1249-13 under the following test conditions: temperature is 40° C. (±0.56° C.) and relative humidity of 50% (±3%). If tropical conditions are required, the temperature is set to 38° C. (±0.56° C.) and the relative humidity to 90% (±3%). The water vapour transmission rate is reported in [g/m$^2$/day]. For materials outside of the Scope (§ 1.1) of ASTM F-1249-13, the water vapour transmission rate test method does not apply.

2) Scanning Electron Microscopy (SEM)

SEM images were recorded by the instrument Zeiss Ultra Plus from Carl Zeiss AG (Oberkochen, Germany) operating at 5.0 kV and equipped with an in-lens secondary electron detector. The sample specimen was prepared by cutting via scalpel a cross-section of the paper at room temperature condition.

3) Transmission Electron Microscopy (TEM)

TEM images of the sandwich-layered film cross-sections were recorded employing the microscope JEOL-JEM-2200FS (JEOL GmbH, Germany). Cross-sections were prepared from the papers by applying a JEOL EM-09100IS Cryo Ion Slicer (JEOL GmbH, Germany).

4) Basal Spacing Via X-Ray Diffraction (XRD)

X-ray diffraction was measured on Bragg-Brentano-type instrument (Empyrean Malvern Panalytical BV, The Netherlands) applying Cu Kα radiation (λ=1.54187 Å). The diffractometer was equipped with a PIXcel-1D detector. The X-ray diffraction patterns were analyzed using Malvern Panalytical's Highscore Plus software to determine the basal spacing ($d_{001}$).

5) Small-Angle X-Ray Scattering (SAXS)

As preliminary, the birefringence optical property of the dispersion was checked with a self-made crossed-polarizer. SAXS analysis of the nematic dispersions were then conducted in 1 mm glass capillaries (Hilgenberg, Germany) at 23° C. by using the system Ganesha Air (SAXSLAB, Denmark). The system was equipped with a rotating anode copper X-ray source MicroMax 007HF (Rigaku Corp., Japan) and a position-sensitive detector PILATUS 300K (Dectris, Switzerland). The sample-to-detector positions were adjustable, covering a wide range of scattering vectors q.

6) Biodegradation Test

Aerobic biodegradation is measured by the production of carbon dioxide ($CO_2$) from the sample specimen according to the test method 301B and the test guidelines 306 of the Section 3 of the OECD Guidelines for the Testing of Chemicals. OECD 301B applies to the major components (paper, barrier, sealant) and the final package. The final package includes all major and minor (inks, varnishes) components and is open to mimic its disposal after consumption. OECD 306 applies to the final package tested in marine water. Pass/fail success criteria are shown below:

| Test Method | Pass Criteria |
|---|---|
| OECD 301B (1992) | 60% th$CO_2$ evolution or |
| Test major components in each layer | 60% th$O_2$ consumption in 60 days |
| Test fully formed sachet* | |
| OECD 306 (1992) | 60% th$CO_2$ evolution or |
| Test fully formed sachet* | 60% th$O_2$ consumption in 60 days |

*Fully formed sachet indicates the final form of the sachet (containing all dyes and coatings) that will be disposed of in the environment. This sachet would be cut open to mimic being ripped open by a consumer.

The sample should biodegrade at least 60% within 60 days, preferably at least 60% within 28 days.

EXAMPLES

Preparation of Paper or Board Prior to Water-Dispersible Nanocomposite Barrier Integration In one embodiment, the inner side of a recyclable and biodegradable 80 g/m$^2$ paper grade PackPro 7.0 from Birgl & Bergmeister (B&B) was coated with a polymeric solution in water (30% solids) via anilox roll process at 40-50 m/min at Jura-Tech GmbH (Germany) and dried via convection dryer. In another embodiment, a recyclable and biodegradable 257 g/m$^2$ board grade Natura from Stora Enso (Finland) was coated with a polymeric solution in water (30% solids) via anilox roll process at 40-50 m/min at Jura-Tech GmbH (Germany) and dried via convection dryer. In both cases, the resulting water-soluble polymeric dry layer was 5μ thick and its composition was 80% PVOH grade Selvol 205 ex Sekisui Chemicals (Japan), 10% glycerol grade CremerGLYC 3109921 ex Cremer Oleo (Germany) and 10% sorbitol grade Neosorb® P 100 T ex Roquette (France).

Preparation of Water-Soluble Polyvinyl Alcohol (PVOH) Solution (30% Solids)

700 g of bi-distilled water was heated to 85° C. in a beaker. 240 g of solid PVOH powder (Selvol 205 ex Sekisui Chemical, Japan), 30 g of glycerol (CremerGLYC 3109921 ex Cremer Oleo, Germany) and 30 g of sorbitol (Neosorb® P 100 T, Roquette, France) were added under magnetic stirring at 200 rpm. The solution was maintained under reflux at 85° C. for 2 hours under stirring up to 200 rpm to dissolve all the solid components. Prior of usage, the PVOH solution was homogenized and defoamed under vacuum (50 mbar) for 10 min under stirring up to 2500 rpm using a SpeedMixer DAC 400.2 VAC-P equipment ex Hauschild (Germany).

Preparation of Water-Dispersible Hectorite Dispersion (6% Solids)

Sodium hectorite $[Na_{0.5}]^{inter}[Mg_{2.5}Li_{0.5}]^{oct}[Si_4]^{tet}O_{10}F_2$ was synthesized, as follows: High purity reagents of $SiO_2$ (Merck, fine granular, washed and calcined quartz), LiF (ChemPur, 99.9%, powder), $MgF_2$ (ChemPur, 99.9%, 3-6 mm pieces, fused), MgO (Alfa Aesar, 99.95%, 1-3 mm fused lumps) and NaF (Alfa Aesar, 99.995%, powder) were carefully weighed according to the composition in the formula. Crucibles made of molybdenum (25 mm outer diameter, 21 mm inner diameter, 180 mm length) were supplied by Plansee SE (Reutte, Austria). These crucibles were first heated up to 1600° C. under vacuum inside a quartz tube placed within a copper based high-frequency induction heating coil for cleaning purpose. The reagents were then added into a crucible under argon atmosphere (glovebox) and heated up to 1200° C. under vacuum to remove any residual water. The crucible was then sealed with a molybdenum lid by heating both parts up to the melting point of molybdenum. The sealed crucible was thus placed horizontally in a graphite furnace under argon atmosphere and rotated at 1750° C. for 80 min. The crucible was then opened, the resulting sodium hectorite was collected, grinded via planetary ball mill, and dried in a clean crucible at 250° C. under argon atmosphere for 14 hours. The crucible was then sealed with a molybdenum lid and annealed at 1045° C. for 6 weeks in a graphite furnace to increase the homogeneity of the sodium hectorite. The material was then placed in a desiccator at (23° C., 43% rH) to reach the hydrated formula $[Na_{0.5}]^{inter}[Mg_{2.5}Li_{0.5}]^{oct}[Si_4]^{tet}O_{10}F_2 \cdot [H_2O]_2$. Bi-distilled water was then added to reach 6% hectorite dispersion in water. Finally, the dispersion was left 1 week at 23° C. for spontaneous delamination of the hectorite nanoplatelets, thus yielding maximum aspect ratio of the hectorite nanoplatelets. The aspect ratio ranges between 400 and 40000.

Preparation of Water-Dispersible Hectorite/PEG Nanocomposite Dispersion (1% Solids)

117 g of 6% hectorite dispersion in water was firstly diluted at 23° C. with 583 g bi-distilled water to obtain 700 g of 1% hectorite dispersion in water. 3 g of PEG 10,000 g/mol supplied by Sigma-Aldrich was separately dissolved at 23° C. with 297 g bi-distilled water to obtain 300 g of 1% PEG 10000 solution. Both dispersion and solution were mixed together at 23° C. to deliver 1000 g of 1% hectorite/PEG 10000 dispersion in water (ratio 70:30). Birefringence optical properties indicate the self-orientation of the hectorite nanoplatelets parallel to each other in the dispersion. 1D small-angle X-ray scattering (SAXS) analysis confirmed the nematic liquid crystal state of the dispersion.

Preparation of Water-Dispersible Hectorite/PEO Nanocomposite Dispersion (1% Solids)

117 g of 6% hectorite dispersion in water was firstly diluted at 23° C. with 583 g bi-distilled water to obtain 700 g of 1% hectorite dispersion in water. 3 g of PEO 2000000 g/mol supplied by Sigma-Aldrich was separately dissolved with 297 g bi-distilled water at 80° C. under agitation to obtain 300 g of 1% PEO 2000000 solution. Both dispersion and solution were mixed together at 23° C. to deliver 1000 g of 1% hectorite/PEO 2000000 dispersion in water (ratio 70:30). Birefringence optical properties indicate the self-orientation of the hectorite nanoplatelets parallel to each other in the dispersion. 1D small-angle X-ray scattering (SAXS) analysis confirmed the nematic liquid crystal state of the dispersion.

Preparation of Water-Dispersible Hectorite/PVOH Nanocomposite Dispersion (5% Solids)

333 g of 6% hectorite dispersion in water was firstly diluted at 23° C. with 67 g bi-distilled water to obtain 400 g of 5% hectorite dispersion in water. 30 g of PVOH grade Poval 10-98 supplied by Kuraray was separately dissolved with 570 g bi-distilled water at 80° C. under agitation to obtain 600 g of 5% PVOH solution. Both dispersion and solution were mixed together at 23° C. to deliver 1000 g of 5% hectorite/PVOH dispersion in water (ratio 40:60). Birefringence optical properties indicate the self-orientation of the hectorite nanoplatelets parallel to each other in the dispersion. 1D small-angle X-ray scattering (SAXS) analysis confirmed the nematic liquid crystal state of the dispersion.

Lab-Scale Making of Paper Laminate with Integrated Water-Dispersible Nanocomposite Barrier All water-borne solutions/dispersion were homogenized at 2500 rpm and degassed at (23° C., 50 mbar) using a SpeedMixer DAC 400.2 VAC-P from Hauschild & Co KG (Hamm, Germany) for 5 min. prior to their usage. A 36μ thick polyethylene terephthalate (PET) film grade Optimont® 501 ex Bleher Folientechnik GmbH (Germany) was used as carrier without further surface treatment. As next step, the carrier film was coated with 30% PVOH solution (described previously) using an automated doctor blade coating equipment (ZAA 2300, Zehntner GmbH Testing Instruments, Switzerland). The speed was set to 15 mm/s, and the blade height was set to 250 μm. The wet coating was dried for 30 min. at 60° C. and the resulting dry layer was about 28 μm thick and composed of 80% PVOH grade Selvol 205, 10% glycerol, 10% sorbitol.

1. Paper Laminate with Integrated Water-Dispersible Hectorite/PEG Nanocomposite Barrier In one embodiment, the Hectorite/PEG nanocomposite barrier was applied by spray coating using a fully automated spray coating system (SATA 4000 LAB HVLP 1.0 mm spray gun ex SATA (Germany). The distance between the spraying nozzle and the PVOH coated PET film was set to 17 cm. Subsequently, the 1% Hectorite/PEG nanocomposite dispersion (described previously) was fed under constant 4 bar pressure in the spray nozzle and applied onto PVOH coated PET film. The wet coating was dried for 30 min at 50° C. and the resulting dry layer was 40 nm thick. The spraying and drying cycle was repeated 100 times, and the resulting dry layer was 4 μm thick and composed of 70% hectorite and 30% PEG 10000 g/mol. As next step, the nanocomposite barrier was coated with 30% PVOH solution (described previously) using the automated doctor blade coating equipment (described previously) and the resulting dry layer was about 26 μm thick and composed of 80% PVOH, 10% glycerol, 10% sorbitol. As next step, the PVOH surface was coated with 1.0-1.5 g/m$^2$ bi-distilled water using the spray coating equipment (described previously) and pressed against the PVOH surface of the PVOH coated paper grade PackPro 7.0 from Birgl & Bergmeister. At this point, the carrier PET film was removed, thus delivering a paper laminate comprising a nanocomposite barrier.

2. Paper Laminate with Integrated Water-Dispersible Hectorite/PEO Nanocomposite Barrier In one embodiment, the Hectorite/PEO nanocomposite barrier was applied by spray coating using a fully automated spray coating system (SATA 4000 LAB HVLP 1.0 mm spray gun ex SATA (Germany). The distance between the spraying nozzle and the PVOH coated PET film was set to 17 cm. Subsequently, the 1% Hectorite/PEO nanocomposite dispersion (described previously) was fed under constant 4 bar pressure in the spray nozzle and applied onto PVOH coated PET film. The wet coating was dried for 30 min at 50° C. and the resulting dry layer was 40 nm thick. The spraying and drying cycle was repeated 100 times, and the resulting dry layer was 4 μm thick and composed of 70% hectorite and 30% PEO 2000000 g/mol. As next step, the nanocomposite barrier was coated with 30% PVOH solution (described previously) using the automated doctor blade coating equipment (described previously) and the resulting dry layer was about 26 μm thick and composed of 80% PVOH, 10% glycerol, 10% sorbitol. As next step, the PVOH surface was coated with 1.0-1.5 g/m$^2$ bi-distilled water using the spray coating equipment (described previously) and pressed against the PVOH surface of the PVOH coated paper grade PackPro 7.0 from Birgl & Bergmeister. At this point, the carrier PET film was removed, thus delivering a water-soluble film with an integrated nanocomposite barrier.

3. Paper Laminate with Integrated Water-Dispersible Hectorite/PVOH Nanocomposite Barrier In one embodiment, the Hectorite/PVOH nanocomposite barrier was applied by doctor blading coating equipment (ZAA 2300, Zehntner GmbH Testing Instruments, Switzerland). The speed was set to 15 mm/s, and the blade height was set to 100 μm. The 5% Hectorite/PVOH nanocomposite dispersion (described previously) was applied onto PVOH coated PET film. The wet coating was dried for 4 hours at 60° C. and composed of 40% hectorite and 60% PVOH grade Poval 10-98. As next step, the nanocomposite barrier was coated with 30% PVOH solution (described previously) using the same equipment and the resulting dry layer was about 26 μm thick and composed of 80% PVOH, 10% glycerol, 10% sorbitol. As next step, the PVOH surface was coated with 1.0-1.5 g/m$^2$ bi-distilled water using the spray coating equipment (described previously) and pressed against the PVOH surface of the PVOH coated paper grade PackPro 7.0 from Birgl & Bergmeister. At this point, the carrier PET film was removed, thus delivering a water-soluble film with an integrated nanocomposite barrier.

TABLE 1

| Sample | Nanocomposite barrier | Nano-composite basal spacing [Å] | Nano-composite barrier caliper [μm] | WVTR (40° C., 50% rH) [g/m$^2$/day] |
|---|---|---|---|---|
| 1 | 70% Hectorite/30% PEG | 18 | 4 | 0.17 |
| 2 | 70% Hectorite/30% PEO | 18 | 4 | 0.09 |
| 3 | 40& Hectorite/60% PVOH | 43 | 3 | 0.18 |

Table 1 provides the barrier performance (WVTR) of the above-mentioned embodiments.

TABLE 2

| | Layers | | | | PTS Recyclability | | Bio-degrad-ability |
|---|---|---|---|---|---|---|---|
| Sample | sealing [μm] | nano-composite barrier [μm] | adhesive [μm] | paper [g/m$^2$] | Recy-clable % | Visual Test | OECD 301B |
| 1 | 28 | 4 | 31 | 80 | 99 | Passed | Passed |
| 2 | 28 | 4 | 31 | 80 | 99 | Passed | Passed |
| 3 | 28 | 3 | 31 | 80 | 99 | Passed | Passed |

Table 2 provides the recyclability and biodegradability of the above-mentioned embodiments.

COMPARATIVE EXAMPLE

A. Barrier Paper Laminate Based on Paper, Polyvinyl Alcohol, and Beeswax

Preparation of Sealing Layer Composition

Polyvinyl alcohol flakes (Selvol 205 ex Sekisui Chemicals) and Sorbitol Solution (E420 USP/FCC grade ex Archer Daniels Midland, 71% D-sorbitol content in water) were pumped into CT-25 Twin Screw compounder ex Baker & Perkins in Saginaw, Michigan (USA), L/D ratio 52, co-rotating screws at 340 rpm speed, profiled temperature at 25° C. (inlet), 170° C. (melting and metering zone) and 150° C. (extrusion die). Water was added as process aid and removed via vacuum pump to substantially produce an anhydrous polymeric strand. The strand was thus air cooled and chopped to produce pellets of 80% PVOH and 20% sorbitol composition. Separately, polyvinyl alcohol flakes (Selvol 205 ex Sekisui Chemicals), glycerol (GL99.7 USP grade ex Peter Cremer Oleo Division) and silicate anti-block particles (Sipernat® 820 A grade ex Evonik Industries AG, Essen, Germany) were compounded via a similar procedure to produce pellets of 74% PVOH, 20% glycerol and 6% anti-block agent composition.

As next step, pellets from both batches were gravimetrically dosed 50% each and dropped into the extruder barrel of a pilot scale cast film line, L/D ratio 30, single 30 mm diameter screw designed for PE blends. The screw rotation speed was set at 30 rpm, the extruder barrel temperatures were set at 25° C. (inlet), 200° C. (melting and metering zone) and 195° C. (extrusion die). The polymeric melt extruded from the slot die was cooled onto a chill roll and calendered to produce a 20 μm thick film of 77% PVOH, 10% glycerol, 10% sorbitol and 3% anti-block composition. The film was thus rewinded under constant tension control into a film roll.

Preparation of Barrier Layer Composition

Beeswax (Cera Alba) off-white pastilles grade 442 were sourced from Strahl & Pitsch in West Babylon, New York (USA) and used as such. The melting point ranges between 62 and 65° C.

Making of Paper Barrier Laminate Based on Paper, Polyvinyl Alcohol and Beeswax

A sheet sized A4 format of 80 $g/m^2$ paper grade Pack Pro 7.0 supplied by Brigl & Bergmeister (Niklasdorf, Austria) was heat laminated on the less shiny paper side against a sheet sized A4 format of 20 μm thick PVOH film as described in the above sealing layer composition paragraph. A lab scale equipment model 480R6 Professional Laminator from Sky DSB in Seoul (South Korea) was used for the lamination step at 140° C. temperature and 575 mm/min infeed speed (setting 3 within 1-6 scale, whereas the max. setting 6 corresponds to 1150 mm/min).

As next step, the paper laminate sheet sized A4 format was coated by beeswax on the shinier, more sized, Pack Pro 7.0 paper side. To do so, a lab scale equipment model C-14 Adhesive Wax Coater from Schaefer Machine Company located in Clinton, Connecticut (USA) was modified by replacing the original blade with Mayer bars of different wire rods diameter, thus enabling different coating thicknesses of melted wax. The temperature of the melted wax was set at 90° C. in the well.

TABLE 3

| Sample | Barrier | Basal spacing [Å] | Barrier [μm] | WVTR (40° C., 50% rH) [$g/m^2$/day] |
|---|---|---|---|---|
| A | Beewax | none | 11.5 | 45 |
| B | Beewax | none | 19.2 | 14 |

Table 3 provides the barrier performance (WVTR) of the above-mentioned embodiments.

Although the moisture barrier of the beeswax coated paper is interesting for some applications, the issue of applying beeswax onto paper is the trade-off between the desired barrier against moisture permeation and the desired paper recyclability. As shown in Table 4 below, all produced comparative examples are failing the PTS recyclability test, the main issue being wax spots detected as unacceptable optical defects, although the recyclable fibers content was high.

TABLE 4

| | Layers | | | PTS Recyclability | | Biodegradability |
|---|---|---|---|---|---|---|
| Sample | Sealing [μm]] | Paper [$g/m^2$] | Barrier [$g/m^2$] | Recyclable % | Visual Test | OECD 301B |
| A | 20 | 80 | 12 | 99 | Passed | Passed |
| B | 20 | 80 | 20 | 99 | Passed | Passed |

Table 4 provides the recyclability and biodegradability of the above-mentioned embodiments.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A paper laminate comprising:

a) a paper or board layer having an outer surface and an inner surface;

b) an adhesive layer having an outer surface and an inner surface, said outer surface disposed on said inner surface of said paper layer;

c) a water-dispersible nanocomposite barrier layer having an outer surface and an inner surface, said outer surface disposed on said inner surface of said adhesive layer;

d) a sealing layer having an outer surface and an inner surface, said outer surface disposed on said inner surface of said water-dispersible nanocomposite barrier layer;

wherein the water-dispersible nanocomposite barrier layer comprises hydrophilic nanoplatelets that are trioctahedral smectites;

wherein each layer and the entire paper laminate achieves at least 60% biodegradation within 60 days in the OECD 301B test.

2. The paper laminate of claim 1, wherein the grammage of the paper laminate is from about 20 to about 1000 g/$m^2$.

3. The paper laminate of claim 1, wherein the WVTR of the paper laminate is from about 0.01 g/$m^2$/day to about 100 g/$m^2$/day when measured at 40° C. temperature and 50% relative humidity according to the ASTM method F1249-13.

4. The paper laminate of claim 1, wherein the WVTR of the paper laminate is from about 0.01 g/$m^2$/day to about 200 g/$m^2$/day when measured at 38° C. temperature and 90% relative humidity according to the ASTM method F1249-13.

5. The paper laminate of claim 1, wherein the WVTR of the paper laminate is from about 0.01 g/$m^2$/day to about 200 g/$m^2$/day when measured at 40° C. temperature and 50% relative humidity according to the ASTM method F1249-13.

6. The paper laminate of claim 1, wherein the WVTR of the paper laminate is from about 0.01 g/$m^2$/day to about 200 g/$m^2$/day when measured at 40° C. temperature and 50% relative humidity according to the ASTM test method F1249-13, even after exposure to several variation cycles of the environmental relative humidity between 10% and 90%.

7. The paper laminate of claim 1, wherein the paper laminate is recyclable and exhibits a recyclable percentage of at least 50 percent as determined by the test method PTS-RH:021/97 (draft October 2019).

8. The paper laminate of claim 1, wherein the paper laminate is recyclable and exhibits an overall "pass" result, as determined by the test method PTS-RH:021/97 (draft October 2019).

9. The paper laminate of claim 1, wherein the paper laminate comprises between about 50 percent and about 100 percent, by weight, of natural fibers.

10. The paper laminate of claim 1, wherein the paper is made of natural fibers comprising at least one of cellulose-based fibers, bamboo fibers, cotton, abaca, kenaf, sabai grass, flax, esparto grass, straw, jute, hemp, bagasse, milkweed floss fibers, pineapple leaf fibers, wood fibers, pulp fibers, or combinations thereof.

11. The paper laminate of claim 1, wherein the paper made of natural fibers comprising wood fibers or pulp fibers.

12. The paper laminate of claim 1, wherein the paper is made of recycled natural fibers as determined by visual inspection.

13. The paper laminate of claim 1, wherein the paper is sized and/or machine-glazed on at least one surface, or is glassine, or is vellum paper.

14. The paper laminate of claim 1, wherein the paper is made via foam-forming process, a paper-making process replacing water by water-based foam.

15. The paper laminate of claim 1, wherein the water-dispersible nanocomposite barrier layer is distinct from the adhesive layer and from the sealing layer observed via scanning electron microscopy (SEM).

16. The paper laminate of claim 1, wherein the average thickness of the water-dispersible nanocomposite barrier layer is from about 0.1 μm to about 20 μm.

17. The paper laminate of claim 1, wherein the water-dispersible nanocomposite barrier layer comprises more than one water-dispersible nanocomposite barrier sublayer.

18. The paper laminate of claim 1, wherein the water-dispersible nanocomposite barrier layer is a nanocomposite comprising the hydrophilic nanoplatelets which are orderly spaced and intercalated polymeric fillers at the nanometric scale, wherein the basal spacing measured via XRD is lower than 100 Å.

19. The paper laminate of claim 18, wherein the average aspect ratio of the hydrophilic nanoplatelets is greater than about 100.

20. The paper laminate of claim 18, wherein the average aspect ratio of the hydrophilic nanoplatelets is from about 100 to about 40,000.

21. The paper laminate of claim 1, wherein the hydrophilic nanoplatelets are synthetic hectorite.

22. The paper laminate of claim 1, wherein the average thickness of the adhesive layer and the sealing layer is from about 1 μm to about 200 μm.

23. The paper laminate of claim 1, wherein the adhesive layer and the sealing layer comprises at least one water-soluble polymer.

24. The paper laminate of claim 23, wherein the water-soluble polymer is polyvinyl alcohol and is either a homopolymer or copolymer and is either partially or fully hydrolysed.

25. The paper laminate of claim 23, wherein the water-soluble polymer is polyvinyl alcohol and has an average molecular weight from about 20,000 Da to about 150,000 Da.

26. The paper laminate of claim 23, wherein the water-soluble polymer is polyvinyl alcohol and is a homopolymer with a degree of hydrolyzation from about 70% to about 100%.

27. The paper laminate of claim 23, wherein the water-soluble polymer is polyethylene oxide and has an average molecular weight from about 50,000 Da to about 400,000 Da.

28. The paper laminate of claim 23, wherein the water-soluble polymer is methylcellulose and has an average molecular weight from about 10,000 Da to about 100,000 Da.

29. The paper laminate of claim 23, wherein the water-soluble polymer is methylcellulose and is methoxyl substituted from about 18% to about 32% and hydroxy-propoxyl substituted from about 4% to about 12%.

30. The paper laminate of claim 23, wherein the water-soluble polymer is sodium alginate and has an average molecular weight from about 10,000 Da to about 240,000 Da.

31. The paper laminate of claim 1, wherein the adhesive layer and the sealing layer comprises at least one plasticizer.

32. The paper laminate of claim 31, wherein the at least one plasticizer is at least one of water, glycerol, sorbitol, propylene glycol (PG), trimethylene glycol (PDO), trimethylolpropane (TMP), methylpropanediol (MPD), 2-methyl-1,3 propanediol (MPO), or mixtures thereof.

33. The paper laminate of claim 1, wherein the sealing layer comprises at least one water-insoluble biodegradable polymer, selected from polyhydroxyalkanoate (PHA), polybutylene succinate co-adipate (PBSA), polybutylene adipate-terephthalate (PBAT), polylactic acid (PLA), thermoplastic starch (TPS) and mixture thereof.

34. The paper laminate according to claim 1, wherein the paper laminate is comprised in the package material for one or more absorbent articles.

35. The paper laminate of claim 1, wherein the hydrophilic nanoplatelets are $[Na_{0.5}]^{inter}[Mg_{2.5}Li_{0.5}]^{oct}[Si_4]^{tet}O_{10}F_2$.

* * * * *